(12) United States Patent
Dua et al.

(10) Patent No.: US 8,933,776 B2
(45) Date of Patent: Jan. 13, 2015

(54) RELATIVE POSITIONING APPLICATIONS IN WIRELESS DEVICES

(75) Inventors: Praveen Dua, Cupertino, CA (US); Lionel Jacques Garin, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 13/594,363

(22) Filed: Aug. 24, 2012

(65) Prior Publication Data
US 2014/0022050 A1     Jan. 23, 2014

Related U.S. Application Data

(60) Provisional application No. 61/674,081, filed on Jul. 20, 2012.

(51) Int. Cl.
| | |
|---|---|
| G05B 19/00 | (2006.01) |
| G05B 23/00 | (2006.01) |
| H04W 4/02 | (2009.01) |
| H04W 64/00 | (2009.01) |

(52) U.S. Cl.
CPC ............ *H04W 4/021* (2013.01); *H04W 64/003* (2013.01)
USPC ............... 340/5.2; 340/573.1; 340/539.13; 340/572.4; 455/456.1; 455/456.3

(58) Field of Classification Search
CPC ............ G06F 13/4022; G06F 13/405; G06F 13/4243; H04W 56/006; H04W 56/38; H04W 80/00; G01S 13/04; G08B 13/1427
USPC ............... 340/5.2, 463, 573.1, 539.13, 572.8; 455/456.1, 456.3, 67.11; 370/252, 235, 370/230, 236, 329
See application file for complete search history.

(56) References Cited

U.S. PATENT DOCUMENTS 5,241,923 A * 9/1993 Janning ..................... 119/721
6,826,161 B1 11/2004 Shahidi et al.
(Continued)

FOREIGN PATENT DOCUMENTS

EP        1355505 A1   10/2003
WO     WO0193434 A2   12/2001

OTHER PUBLICATIONS

Partial International Search Report—PCT/US2013/044463—ISA/EPO—Dec. 5, 2013.
(Continued)

*Primary Examiner* — Hoi Lau
(74) *Attorney, Agent, or Firm* — Hunter Clark PLLC

(57) ABSTRACT

Techniques for determining whether a mobile device crosses a boundary defined by a first wireless access point (WAP) and a second fixed-location WAP are provided. A method according to these techniques includes receiving, at a mobile device, information defining a boundary defined by first and second fixed-location WAPs, the boundary being defined at least in part based on a ratio of a round trip time (RTT) between the mobile device and the first fixed-location WAP to a ratio of a RTT between the mobile device and the second fixed-location WAP, determining the ratio of the RTT between the mobile device and the first fixed-location WAP to a ratio of the RTT between the mobile device and the second fixed-location WAP, determining whether the mobile device has crossed the boundary, and triggering an event in response to the mobile device crossing the boundary.

40 Claims, 13 Drawing Sheets

(56) References Cited

U.S. PATENT DOCUMENTS

| | | | |
|---|---|---|---|
| 6,876,326 B2 | 4/2005 | Martorana | |
| 7,027,822 B1 | 4/2006 | Hwang et al. | |
| 7,259,718 B2* | 8/2007 | Patterson et al. | 342/463 |
| 7,689,001 B2* | 3/2010 | Kim et al. | 382/103 |
| 7,797,030 B2* | 9/2010 | Lahm et al. | 600/407 |
| 7,912,481 B2 | 3/2011 | Fujiwara et al. | |
| 8,116,748 B2 | 2/2012 | Aaron | |
| 8,165,150 B2 | 4/2012 | Aweya et al. | |
| 8,249,689 B2* | 8/2012 | Anderson | 600/424 |
| 8,378,815 B1* | 2/2013 | McNulty et al. | 340/539.13 |
| 8,639,757 B1* | 1/2014 | Zang et al. | 709/204 |
| 2002/0060788 A1* | 5/2002 | Ohtomo et al. | 356/139.1 |
| 2003/0179140 A1* | 9/2003 | Patterson et al. | 342/463 |
| 2005/0035862 A1* | 2/2005 | Wildman et al. | 340/573.1 |
| 2005/0104776 A1* | 5/2005 | Anderson | 342/450 |
| 2005/0148850 A1* | 7/2005 | Lahm et al. | 600/407 |
| 2007/0123308 A1* | 5/2007 | Kim et al. | 455/566 |
| 2007/0247316 A1* | 10/2007 | Wildman et al. | 340/572.4 |
| 2007/0268911 A1 | 11/2007 | Alve | |
| 2007/0287386 A1 | 12/2007 | Agrawal et al. | |
| 2008/0084272 A1 | 4/2008 | Modiano | |
| 2008/0125129 A1 | 5/2008 | Lee | |
| 2008/0155078 A1 | 6/2008 | Parkkinen et al. | |
| 2008/0204004 A1* | 8/2008 | Anderson | 324/207.13 |
| 2009/0033499 A1* | 2/2009 | Malik | 340/572.8 |
| 2009/0059797 A1 | 3/2009 | Northcutt et al. | |
| 2010/0159833 A1 | 6/2010 | Lewis et al. | |
| 2010/0273504 A1 | 10/2010 | Bull et al. | |
| 2011/0090081 A1* | 4/2011 | Khorashadi et al. | 340/539.13 |
| 2011/0244881 A1 | 10/2011 | Bando et al. | |
| 2011/0298615 A1* | 12/2011 | Rich et al. | 340/539.13 |
| 2012/0253725 A1* | 10/2012 | Malka et al. | 702/94 |
| 2014/0022050 A1* | 1/2014 | Dua et al. | 340/5.2 |
| 2014/0022920 A1* | 1/2014 | Dua et al. | 370/252 |

OTHER PUBLICATIONS

Wang, H., et al., "A survey of range-based localization algorithms for cognitive radio networks," Consumer Electronics, Communications and Networks (CECNET), 2012 2nd International Conference on, IEEE, Apr. 21, 2012, pp. 844-847, XP032181652, DOI: 10.1109/CECNET. 2012.6201449 ISBN: 978-1-4577-1414-6.

International Search Report and Written Opinion—PCT/US2013/044463—ISA/EPO—Feb. 3, 2014.

Non-Final Office Action; U.S. Appl. No. 13/758,531; Jul. 24, 2014.

* cited by examiner

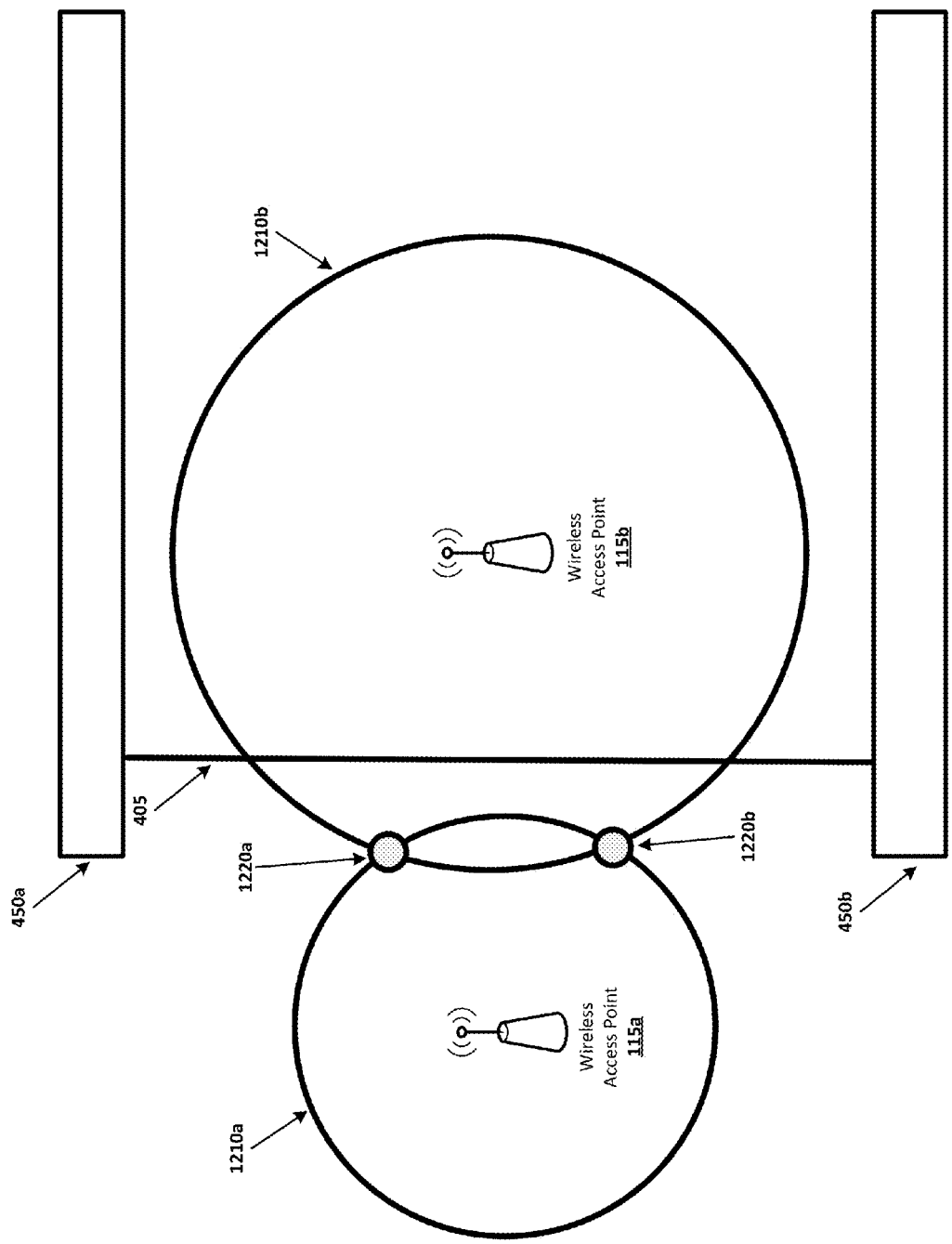

RELATIVE POSITIONING APPLICATIONS IN WIRELESS DEVICES

CLAIM OF PRIORITY UNDER 35 U.S.C. §119

This application claims priority to U.S. provisional patent application No. 61/674,081, titled "Relative Positioning Applications in Wireless Devices," filed on Jul. 20, 2012, which is assigned to the assignee hereof, and expressly incorporated herein by reference."

BACKGROUND

Various location services are available to mobile devices based on the absolute positions of those devices. Location services generally utilize an absolute location such as a latitude and a longitude to determine the behavior of the location service; e.g., what information or response to provide to the user.

However, relative positioning can be used in place of or conjunction with absolute positioning to provide location services to a mobile device, to improve relative location accuracy between devices and/or to support location models not adequately addressed by absolution location technologies.

SUMMARY

An example of a method for determining whether a mobile device crosses a boundary defined by a first wireless access point and a second wireless access point according to the disclosure includes receiving, at the mobile device, information defining the boundary defined by the first wireless access point and the second wireless access point. The boundary is defined at least in part based on a ratio of a round trip time (RTT) between the mobile device and the first wireless access point to a RTT between the mobile device and the second wireless access point. The method also includes determining the ratio of the RTT between the mobile device and the first wireless access point to the RTT between the mobile device and the second wireless access point, determining whether the mobile device has crossed the boundary, and triggering an event responsive to the mobile device crossing the boundary.

Implementations of such a method may include one or more of the following features. Determining the RTT between the mobile device and the first wireless access point by measuring an amount of time from transmission of a message from the mobile device to receipt of an acknowledgement of the message at the mobile device, and determining the RTT between the mobile device and the second wireless access point by measuring an amount of time from transmission of a message from the mobile device to receipt of an acknowledgement of the message at the mobile device. Determining a set of possible positions of the mobile device relative to the first wireless access point and the second wireless access point. The boundary comprises a line separating the first wireless access point and a second wireless access point. Repeatedly determining RTT values between the mobile device and the first wireless access point and RTT values between the mobile device and the second wireless access point, and determining a direction of travel of the mobile device based at least in part on the RTT values. The determining whether the mobile device crosses the boundary includes determining whether the mobile device crosses the boundary in a first direction or in a second direction based on the direction of travel of the mobile device, and triggering the event includes triggering the event responsive to the mobile device crossing the boundary in the first direction. The mobile device is mounted on a vehicle and the first wireless access point and the second wireless access point are mounted proximate and collinear to a roadway on which the vehicle is traveling. The mobile device is associated with a vehicle and the wireless access points define a boundary associated with an entrance to a paid access area. The paid access area comprises a toll road or a pay parking lot. Triggering storage of a time stamp responsive to the mobile device crossing the boundary in a first direction to enter the pay parking lot, and triggering calculation of parking fees based on an elapsed time in the pay parking lot responsive to the mobile device crossing the boundary in a second direction.

An example of an apparatus for determining whether a mobile device crosses a boundary defined by a first wireless access point and a second wireless access point according to the disclosure includes means for receiving, at the mobile device, information defining the boundary defined by the first wireless access point and the second wireless access point. The boundary is defined at least in part based on a ratio of a round trip time (RTT) between the mobile device and the first wireless access point to a RTT between the mobile device and the second wireless access point. The apparatus also includes means for determining the ratio of the RTT between the mobile device and the first wireless access point to the RTT between the mobile device and the second wireless access point, means for determining whether the mobile device has crossed the boundary, and means for triggering an event responsive to the mobile device crossing the boundary.

Implementations of such an apparatus may include one or more of the following features. Means for determining the RTT between the mobile device and the first wireless access point by measuring an amount of time from transmission of a message from the mobile device to receipt of an acknowledgement of the message at the mobile device, and means for determining the RTT between the mobile device and the second wireless access point by measuring an amount of time from transmission of a message from the mobile device to receipt of an acknowledgement of the message at the mobile device. Means for determining a set of possible positions of the mobile device relative to the first wireless access point and the second wireless access point. The boundary comprises a line separating the first wireless access point and a second wireless access point. Means for repeatedly determining RTT values between the mobile device and the first wireless access point and RTT values between the mobile device and the second wireless access point, and means for determining a direction of travel of the mobile device based at least in part on the RTT values. The means for determining whether the mobile device crosses the boundary comprises means for determining whether the mobile device crosses the boundary in a first direction or in a second direction based on the direction of travel of the mobile device, and the means for triggering the event is responsive to the mobile device crossing the boundary in the first direction. The mobile device is mounted on a vehicle and the first wireless access point and the second wireless access point are mounted proximate and collinear to a roadway on which the vehicle is traveling. The mobile device is associated with a vehicle and the wireless access points define a boundary associated with an entrance to a paid access area. The paid access area comprises a toll road. The paid access area comprises a pay parking lot. Means for triggering storage of a time stamp responsive to the mobile device crossing the boundary in a first direction to enter the pay parking lot, and means for triggering calculation of parking fees based on an elapsed time in the pay parking lot responsive to the mobile device crossing the boundary in a second direction.

An example computer-readable storage medium, having stored thereon computer-readable instructions for determining whether a mobile device crosses a boundary defined by a first wireless access point and a second wireless access point, according to the disclosure includes instructions configured to cause at least one processor to receive, at the mobile device, information defining the boundary defined by the first wireless access point and the second wireless access point. The boundary is defined at least in part based on a ratio of a round trip time (RTT) between the mobile device and the first wireless access point to a RTT between the mobile device and the second wireless access point. The medium also includes instructions to cause the at least one processor to determine the ratio of the RTT between the mobile device and the first wireless access point to the RTT between the mobile device and the second wireless access point, determine whether the mobile device has crossed the boundary, and trigger an event responsive to the mobile device crossing the boundary.

Implementations of such a medium may include one or more of the following features. Instructions configured to cause at least one processor to determine the RTT between the mobile device and the first wireless access point by measuring an amount of time from transmission of a message from the mobile device to receipt of an acknowledgement of the message at the mobile device, and instructions configured to cause at least one processor to determine the RTT between the mobile device and the second wireless access point by measuring an amount of time from transmission of a message from the mobile device to receipt of an acknowledgement of the message at the mobile device. Instructions configured to cause at least one processor to determine a set of possible positions of the mobile device relative to the first wireless access point and the second wireless access point. The boundary comprises a line separating the first wireless access point and a second wireless access point. Instructions to cause the at least one processor to: repeatedly determine RTT values between the mobile device and the first wireless access point and RTT values between the mobile device and the second wireless access point, and determine a direction of travel of the mobile device based at least in part on the RTT values. The instructions to cause the at least one processor to determine whether the mobile device crosses the boundary comprise instructions to cause the at least one processor to determine whether the mobile device crosses the boundary in a first direction or in a second direction based on the direction of travel of the mobile device, and the instructions to cause the at least on processor to trigger the event comprise instructions to cause the at least one processor to trigger the event responsive to the mobile device crossing the boundary in the first direction. The mobile device is mounted on a vehicle and the first wireless access point and the second wireless access point are mounted proximate and collinear to a roadway on which the vehicle is traveling. The mobile device is associated with a vehicle and the wireless access points define a boundary associated with an entrance to a paid access area. The paid access area comprises a toll road or a pay parking lot. Instructions configured to cause at least one processor to trigger storage of a time stamp responsive to the mobile device crossing the boundary in a first direction to enter the pay parking lot, and trigger calculation of parking fees based on an elapsed time in the pay parking lot responsive to the mobile device crossing the boundary in a second direction.

An example of apparatus for determining whether a mobile device crosses a boundary defined by a first wireless access point and a second wireless access point according to the disclosure includes a wireless transceiver configured to transmit signals to and to receive signals from the first wireless access point and the second wireless access point, a tangible, non-transitory computer-readable memory, a plurality of modules comprising processor executable code stored in the memory, a processor connected to the memory and configured to access the plurality of modules stored in the memory, and a relative positioning module. The relative positioning module is configured to receive, at the mobile device, information defining the boundary defined by the first wireless access point and the second wireless access point. The boundary being is at least in part based on a ratio of a round trip time (RTT) between the mobile device and the first wireless access point to a RTT between the mobile device and the second wireless access point. The relative positioning module is also configured to determine the ratio of the RTT between the mobile device and the first wireless access point to the RTT between the mobile device and the second wireless access point, determine whether the mobile device has crossed the boundary, and trigger an event responsive to the mobile device crossing the boundary.

Implementations of such an apparatus may include one or more of the following features. The relative positioning module is further configured to determine the RTT between the mobile device and the first wireless access point by measuring an amount of time from transmission of a message from the mobile device to receipt of an acknowledgement of the message at the mobile device, and to determine the RTT between the mobile device and the second wireless access point by measuring an amount of time from transmission of a message from the mobile device to receipt of an acknowledgement of the message at the mobile device. The relative positioning module is further configured to determine a position of the mobile device relative to the first wireless access point and the second wireless access point. The boundary comprises a line separating the first wireless access point and a second wireless access point. The relative positioning module is configured to trigger the event responsive to the mobile device crossing the boundary is further configured to: repeatedly determine RTT values between the mobile device and the first wireless access point and RTT values between the mobile device and the second wireless access point, and determine a direction of travel of the mobile device based at least in part on the RTT values. The relative positioning module is configured to determine whether the mobile device crosses the boundary is further configured to determine whether the mobile device crosses the boundary in a first direction or in a second direction based on the direction of travel of the mobile device, and the relative positioning module being configured to trigger the event is further configured to trigger the event responsive to the mobile device crossing the boundary in the first direction. The mobile device is mounted on a vehicle and the first wireless access point and the second wireless access point are mounted proximate and collinear to a roadway on which the vehicle is traveling. The mobile device is associated with a vehicle and the wireless access points define a boundary associated with an entrance to a paid access area. The paid access area comprises a toll road or a pay parking lot. The relative positioning module is further configured to trigger storage of a time stamp responsive to the mobile device crossing the boundary in a first direction to enter the pay parking lot, and trigger calculation of parking fees based on an elapsed time in the pay parking lot responsive to the mobile device crossing the boundary in a second direction.

An example of a method for controlling access to electronic content at a wireless access point according to the disclosure includes measuring a round-trip time (RTT) associated with a signal transmitted between a mobile device and the wireless access point, receiving a RTT reference value associated with access to the electronic content, comparing the measured RTT with the RTT reference value, and providing permission to access the electronic content to the mobile device responsive to the measured RTT having a desired relationship to the RTT reference value.

Implementations of such a method may include one or more of the following features. Providing access to the electronic content comprises sending an instruction to a server to push the electronic content to the mobile device. Authenticating the mobile device to determine whether the mobile device is authorized to access the electronic content, and providing permission to access the electronic content to the mobile device only if the mobile device is authorized to access the electronic content. Authenticating the mobile device to determine whether the mobile device is authorized to access the electronic content includes comparing a Media Access Control (MAC) address of the mobile device to a set of authorized MAC addresses to determine whether the mobile device is authorized to access the electronic content.

An example apparatus for controlling access to electronic content at a wireless access point according to the disclosure includes means for measuring a round-trip time (RTT) associated with a signal transmitted between a mobile device and the wireless access point, means for receiving a RTT reference value associated with access to the electronic content, means for comparing the measured RTT with the RTT reference value; and means for providing permission to access the electronic content to the mobile device responsive to the measured RTT having a desired relationship to the RTT reference value.

Implementations of such an apparatus may include one or more of the following features. Means for providing permission to access the electronic content comprises sending a message to a server to push the electronic content to the mobile device. Means for authenticating the mobile device to determine whether the mobile device is authorized to access the electronic content, and means for providing permission to access the electronic content to the mobile device only if the mobile device is authorized to access the electronic content. The means for authenticating the mobile device to determine whether the mobile device is authorized to access the electronic content includes means for comparing a Media Access Control (MAC) address of the mobile device to a set of authorized MAC addresses to determine whether the mobile device is authorized to access the electronic content.

A tangible computer-readable medium, having stored thereon computer-readable instructions for controlling access to electronic content at a wireless access point, according to the disclosure includes instructions configured to cause at least one processor to measure a round-trip time (RTT) associated with a signal transmitted between a mobile device and the wireless access point, receive a RTT reference value associated with access to the electronic content, compare the measured RTT with the RTT reference value, and provide permission to access the electronic content to the mobile device responsive to the measured RTT having a desired relationship to the RTT reference value.

Implementations of such a medium may include one or more of the following features. The instructions to cause the at least one processor to provide permission to access the electronic content include instructions to cause the at least one processor to send a message to a server to push content the electronic to the mobile device. Instructions to cause the at least one processor to authenticate the mobile device to determine whether the mobile device is authorized to access the electronic content, and to provide permission to access the electronic content to the mobile device only if the mobile device is authorized to access the electronic content. The instructions to cause the at least one processor to authenticate the mobile device to determine whether the mobile device is authorized to access the electronic content include instructions to cause the at least one processor to compare a Media Access Control (MAC) address of the mobile device to a set of authorized MAC addresses to determine whether the mobile device is authorized to access the electronic content.

An apparatus for controlling access to electronic content at a wireless access point according to the disclosure includes a wireless transceiver for transmitting signals to and receiving signals from the wireless access point, a tangible, non-transitory computer-readable memory, a plurality of modules comprising processor executable code stored in the memory, a processor connected to the memory and configured to access the plurality of modules stored in the memory, a relative positioning module, and a content control module. The relative positioning module is configured to measure a round-trip time (RTT) associated with a signal transmitted between a mobile device and the wireless access point. The content control module configured to receive a RTT reference value associated with access to the electronic content, to compare the measured RTT with the RTT reference value, and to provide permission to access the electronic content to the mobile device responsive to the measured RTT having a desired relationship to the RTT reference value.

Implementations of such an apparatus may include one or more of the following features. The content control module being configured to provide permission to access the electronic content is further configured to send a message to a server to push content to the mobile device. The content control module is further configured to authenticate the mobile device to determine whether the mobile device is authorized to access the electronic content, and to provide permission to access the electronic content to the mobile device only if the mobile device is authorized to access the electronic content. The content control module being configure to authenticate the mobile device to determine whether the mobile device is authorized to access the electronic content is further configured to compare a Media Access Control (MAC) address of the mobile device to a set of authorized MAC addresses to determine whether the mobile device is authorized to access the electronic content.

An example of a method for sharing content between mobile wireless devices according to the disclosure includes measuring a round-trip time (RTT) associated with a signal transmitted between a first mobile device and a second mobile device, the signal being transmitted directly from the first mobile device to the second mobile device without being routed through a wireless network providing wireless network access to the first mobile device or the second mobile device, comparing the measured RTT with an RTT reference value, and providing permission to access the electronic content associated with the first mobile device to the second mobile device responsive to the measured RTT having a desired relationship to the RTT reference value.

Implementation of such a method may include one or more of the following features. Providing permission to access the electronic content associated with the first mobile device to the second mobile device further comprises pushing content from the first mobile device to the second mobile device. Providing permission to access the electronic content associated with the first mobile device to the second mobile device further comprise providing a network address to the second mobile device at which the second mobile device can access the electronic content. Repeatedly measuring the RTT associated with signals transmitted between a first mobile device and a second mobile device after providing permission to access the electronic content associated with the first mobile device to the second mobile device, and revoking access to the electronic content by the second mobile device if the second mobile device moves further than the predetermined distance from the first mobile wireless device.

An example apparatus for sharing content between mobile wireless devices according to the disclosure includes means for measuring a round-trip time (RTT) associated with a signal transmitted between a first mobile device and a second mobile device, the signal being transmitted directly from the first mobile device to the second mobile device without being routed through a wireless network providing wireless network access to the first mobile device or the second mobile device, means for comparing the measured RTT with an RTT reference value, and means for providing permission to access the electronic content on the first mobile device to the second mobile device responsive to the measured RTT having a desired relationship to the RTT reference value.

Implementations of such an apparatus may include one or more of the following features. The means for providing permission to access the electronic content on the first mobile device to the second mobile device includes means for pushing content from the first mobile device to the second mobile device. The means for providing permission to access the electronic content on the first mobile device to the second mobile device includes means for providing a network address to the second mobile device at which the second mobile device can access the electronic content. Means for repeatedly measuring the RTT associated with signals transmitted between a first mobile device and a second mobile device after providing permission to access the electronic content associated with the first mobile device to the second mobile device, and means for revoking access to the electronic content by the second mobile device if the second mobile device moves further than the predetermined distance from the first mobile device.

A computer-readable storage medium, having stored thereon computer-readable instructions for sharing content between mobile wireless devices, according to the disclosure includes instructions configured to cause at least one processor to: measure a round-trip time (RTT) associated with a signal transmitted between a first mobile device and a second mobile device, the signal being transmitted directly from the first mobile device to the second mobile device without being routed through a wireless network providing wireless network access to the first mobile device or the second mobile device, compare the measured RTT with an RTT reference value, and provide permission to access the electronic content on the first mobile device to the second mobile device responsive to the measured RTT having a desired relationship to the RTT reference value.

Implementations of such a medium may include one or more of the following features. The instructions configured to provide permission to access the electronic content on the first mobile device to the second mobile device include instructions to cause the at least one processor to push content from the first mobile device to the second mobile device. The instructions configured to provide permission to access the electronic content on the first mobile device to the second mobile device include instructions to cause the at least one processor to provide a network address to the second mobile device at which the second mobile device can access the electronic content, and download the electronic content to the second mobile device.

68. The medium of claim 65 further comprising instructions to cause the at least one processor to:

repeatedly measure the RTT associated with signals transmitted between a first mobile device and a second mobile device after providing permission to access the electronic content associated with the first mobile device to the second mobile device, and revoke access to the electronic content by the second mobile device if the second mobile device moves further than the predetermined distance from the first mobile device.

An apparatus for controlling access to electronic content according to the disclosure includes a tangible, non-transitory computer-readable memory, a plurality of modules comprising processor executable code stored in the memory, a processor connected to the memory and configured to access the plurality of modules stored in the memory, and a relative positioning module and a content control module. The relative positioning module is configured to measure a round-trip time (RTT) associated with a signal transmitted between a mobile device and a wireless access point. The content control module configured to compare the measured RTT with an RTT reference value, and provide permission to access the electronic content on the first mobile device to the second mobile device responsive to the measured RTT having a desired relationship to the RTT reference value. The content control module being configured to provide permission to access the electronic content on the first mobile device to the second mobile device is further configured to push content from the first mobile device to the second mobile device. The content control module being configured to provide permission to access the electronic content on the first mobile device to the second mobile device is further configured to provide a network address to the second mobile device at which the second mobile device can access the electronic content. The content control module is configured to instruct the relative positioning module to repeatedly measure the RTT associated with signals transmitted between a first mobile device and a second mobile device after the content control module has provided access to the electronic content on the first mobile device to the second mobile device, and revoke access to the electronic content by the second mobile device if the second mobile device moves further than the predetermined distance from the first mobile device.

BRIEF DESCRIPTION OF THE DRAWINGS

FIG. 13 is a block diagram illustrating the boundary crossing technique illustrated in FIG. 4.

DETAILED DESCRIPTION

Figure 1:
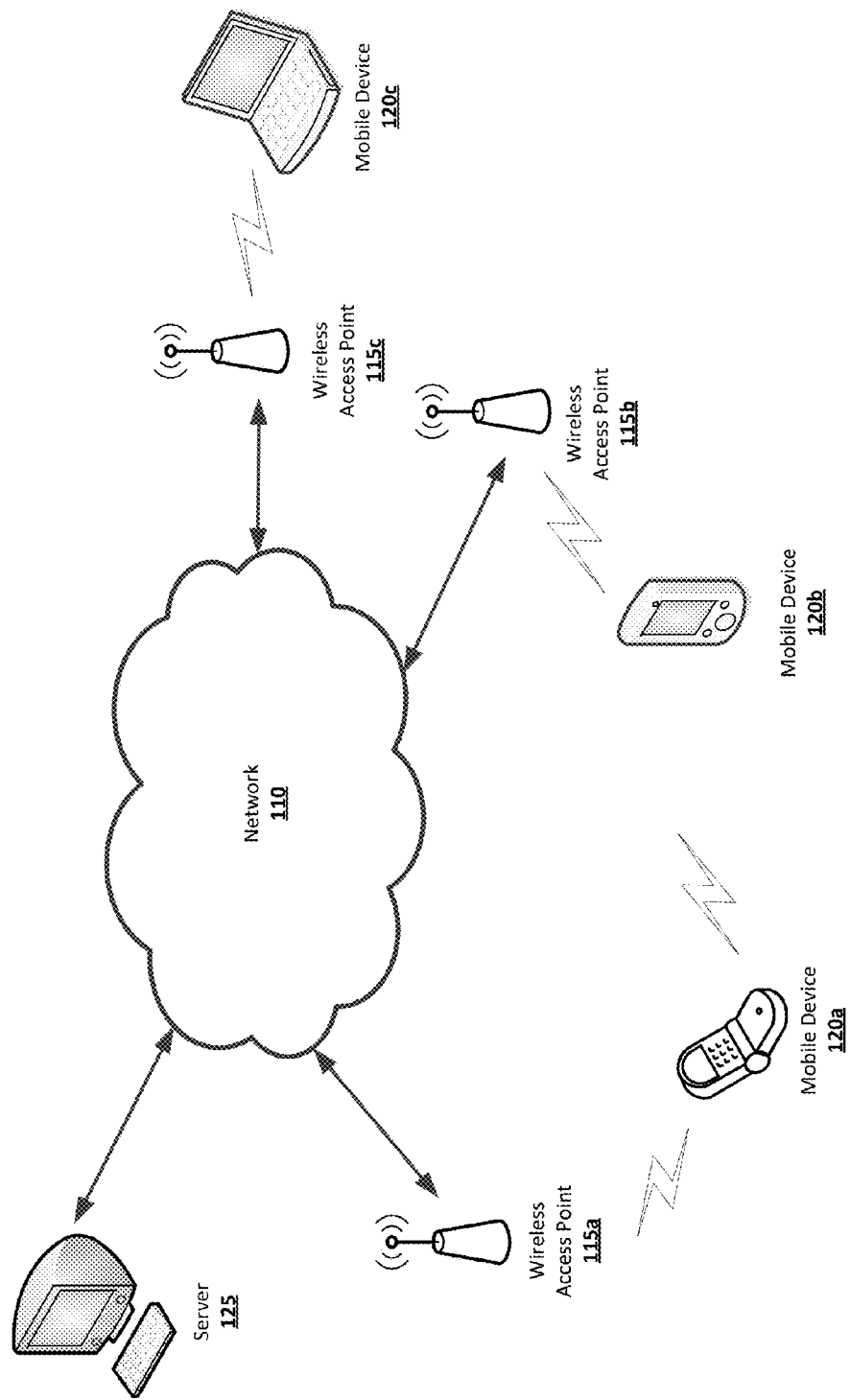
FIG. 1 is a diagram illustrating an example wireless network environment in which the relative positioning techniques discussed herein can be implemented.

As used herein, a mobile device, also referred to as a mobile terminal (MT), a mobile station (MS) or user equipment (UE), is a device such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term mobile device includes devices that communicate with a personal navigation device (PND), such as by short-range wireless, infrared, wireline connection, or other connection—regardless of whether satellite signal reception, assistance data reception, and/or position-related processing occurs at the device or at the PND. Also, the term mobile device includes devices, including wireless communication devices, computers, laptops, etc. that are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a mobile device.

Techniques for relative positioning of wireless devices are provided. Some implementations described herein use RTT (Round Trip Time) measurements from a wireless mobile device to "ping" another mobile device or fixed infrastructure, such as a wireless access point or a wireless base station. RTT can represent the amount of time that it takes for a signal sent by a first mobile device to travel from the mobile device to a wireless access point or to a second mobile device and for an acknowledgement sent by the wireless access point or the second mobile device to travel from the wireless access point or the second mobile device to the first mobile device. The RTT can also include processing time for the wireless access point or the second mobile device to process the signal received from the first mobile device and to generate the acknowledgement. Alternatively, RTT can represent the amount of time that it takes for a signal sent by the wireless access point to travel from the wireless access point to a mobile device and for an acknowledgement sent by the mobile wireless device to travel from the mobile wireless device to the wireless access point. The RTT can also include processing time for the mobile device to process the signal received from the wireless access point and to generate the acknowledgement. The various implementations described herein are not limited to RTT and could be used with other relative position measurement techniques and/or with absolute position measurement techniques.

RTT and other one-to-one distance measuring techniques used in the implementations discussed herein may be used without synchronization from the underlying network infrastructure. Furthermore, the RTT techniques disclosed herein may be compatible with WLAN Wi-Fi and may be implemented without any association with a wireless access point or another mobile device. Wi-Fi chipset implementations may include packet generation functions and parsing functions that can be used to support the RTT techniques disclosed herein. Furthermore, at least some of the techniques disclosed herein may be implemented using communication between to Wi-Fi nodes without the support of other network infrastructure. Accordingly, power consumption to support these techniques may be relatively minimal, which can extend the battery life of a mobile device.

FIG. 1 is a diagram illustrating an example wireless network environment in which the relative positioning techniques discussed herein can be implemented. In the example illustrated in FIG. 1, the wireless network environment includes plurality of wireless access points 115, a plurality of mobile devices 120, a network 110, and a server 125.

The example network environment illustrated in FIG. 1 includes three wireless access points 115a, 115b, and 115c, but other network environments that can be used to implement the relative positioning techniques disclosed herein may include either more or less wireless access points. The term "access point" is used for simplicity, but refers to communication devices, more generally, one example of which include access points in wireless local area networks, such as IEEE 802 series compliant networks including the IEEE 802.11 family of standards commonly referred to as Wi-Fi. For example, devices that use Bluetooth can be communication devices according to the disclosure. As such, the usage of the term access point is not exclusive of other kinds of communication networks. Furthermore, a wireless access point 115 can be configured to implement other wireless communications standards in addition or instead of standards from the IEEE 802 series. The wireless access point 115 can also be implemented as a femtocell that is configured to operate a base station for a mobile communications network. A wireless access point 115 can either be located at a fixed location or may be mobile. For example, a wireless access point 115 can be a mobile device that is configured to provide a WiFi hotspot and is configured to wirelessly connect to a mobile communication network, e.g. a WAN to provide network connectivity to the WiFi hotspot.

The example network environment illustrated in FIG. 1 also includes three mobile devices 120a, 120b, and 120c, but other network environments that can be used to implement the relative positioning techniques disclosed herein may include either more or less wireless access points. The mobile devices 120a, 120b, and 120c can be configured to communicate with one or more servers 125, for example, through one of the wireless access points 115a, 115b, and 115c. The server 125 can be configured to store controlled electronic content that can be provided to one or more mobile devices 120 based the relative position of the mobile devices 120 to another mobile device 120 or to a wireless access point 115. The server can also be configured to analyze RTT measurements sent by the mobile devices 120a, 120b, and 120c and the wireless access points 115a, 115b, and 115c, and to make determinations whether content should be shared with one or more mobile devices or whether an event should be triggered if one or more of the mobile devices cross a predetermined boundary defined by the wireless access points 115.

The following examples illustrate how RTT and other relative positioning techniques can be implemented in wireless devices.

Two Nodes Using RTT Information or Other Relative Positioning Information Only

A first illustrative example of a relative positioning technique (also referred to herein as relative geofencing) includes two wireless nodes and uses, preferably only, RTT information or other relative positioning information. Preferably, no absolute positioning information, such as that obtained from a Global Positioning System (GPS) or other Global Navigation Satellite System (GNSS), is used. However, absolute positioning information could be used to supplement the relative positioning information where available.

Relative geofencing techniques can be implemented where both nodes are mobile. For example, the owner of a mobile device may want to know whether an asset or person of interest exits an area within the predetermined boundary surrounding the user's mobile device. The person of interest or the asset is associated with a mobile wireless device, and the position of that mobile wireless device relative to the user's mobile wireless device can be determined using RTT or other relative positioning techniques. For example, RTT can be used to determine whether the person or asset of interest is within a certain radius of the user's mobile device by measuring the RTT between the user's mobile device and the mobile device associated with the person or asset of interest. The RTT measurements can be compared to a reference RTT value or the RTT measurements can be converted to a distance between the mobile devices.

Relative geofencing techniques preferably have limited dependency on the environment. For example, wall locations, attenuations caused by objects in the environment, multipath issues that may be encountered in a wireless communications environment are less of a problem in the relative geofencing techniques described herein compared to conventional geofencing techniques that use absolute locations. The relative positions of the user's mobile device and of mobile device associated with the person or asset of interest can be tracked based on signals transmitted between the two devices propagated between one another. Since the signals are known to travel at the speed of light, the distance between the two devices can be calculated based on the time it takes for signals to propagate between the devices. The relative positioning techniques discussed herein do not require that the mobile devices include GPS sensors to determine the absolute position of the mobile devices. However, when absolute positioning data is available, the absolute positioning data can be used in supplement the relative positioning information.

Where one node is a mobile device and the other is a wireless access point at a fixed location, conventional geofencing techniques as well as reverse geofencing techniques can be applied. Reverse geofencing techniques can be used to alert a mobile device when an access point is within a predetermined perimeter around the mobile device.

Depending upon the implementation, the two wireless nodes may be mobile devices 120 or a mobile device 120 and a device having a fixed location, such as a wireless access point 115 or base station. The mobile device could be a mobile phone, a handheld computer system (such as a tablet computer, PDA, or other similar device), a laptop computer system, or other device that includes a transmitter for transmitting data from the mobile wireless device to another wireless device and a receiver for receiving data from another wireless device. The fixed location device can be a Wi-Fi access point and the mobile device can be a Wi-Fi-enabled mobile phone or other device. In some implementations, the wireless access point 115 can also be mobile and the techniques disclosed herein can be applied to the mobile wireless access point and the mobile devices 120. For example, the wireless access point 115 could be a portable Wi-Fi hotspot that can be configured to connection to a wide area network (WAN) provided by a mobile communication network provider and can be configured to provide network connectivity to one or more Wi-Fi enabled devices. The wireless access point 115 can also be configured to provide connectivity using other networking protocols, such as Bluetooth.

Some example implementations of two node relative positioning applications are described below that illustrates the two node relative positioning techniques. These implementations are intended to be illustrative and not to limit these techniques to these particular example implementations.

Figure 2:
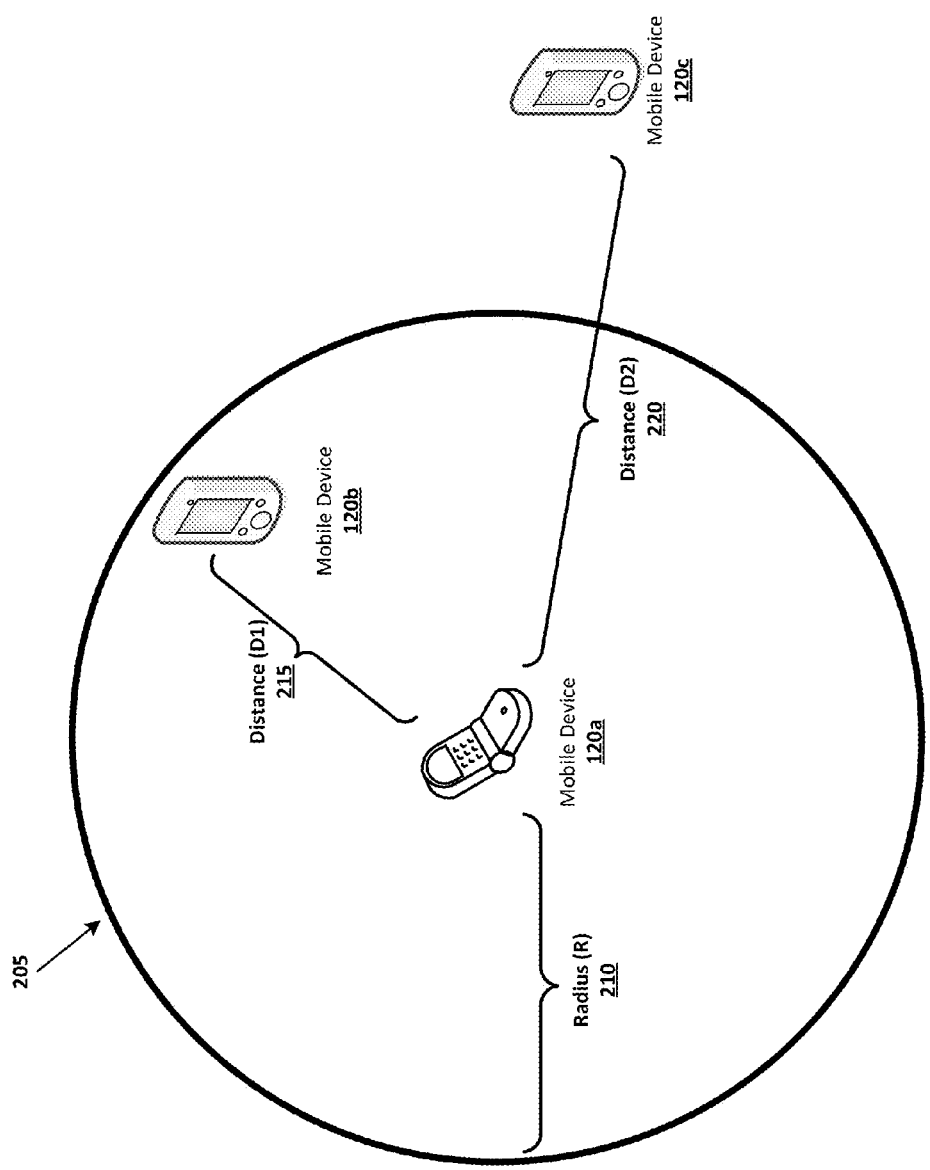
FIG. 2 is a diagram illustrating an example network environment that includes three mobile devices in which the relative positioning techniques discussed herein can be implemented.

FIG. 2 is a diagram of mobile devices that illustrates the concepts described above. The mobile device 120a can use RTT to determine the distance 215 (D1) between the mobile device 120a and the mobile device 120b and/or the distance 220 (D2) between the mobile device 120a and the mobile device 120c. If the distance 215 (D1) or the distance 220 (D2) is less than a predetermined distance from the mobile device 120a, an event can be triggered. For example, a message may be generated to the user of the mobile device 120a indicating the presence of the mobile device 120b or 120c within the predetermined distance from the mobile device. Other types of events can also be triggered. The example implementations described below provide some examples of the types of events that may be triggered.

In the example illustrated in FIG. 2, RTT can be used to determine whether the mobile devices 120b and 120c have entered within a predetermined boundary 205 surrounding the mobile device 120a. The predetermined boundary 205 represents an area surrounding the mobile device 120a that can move relative to the mobile device 120a and can be represented as an RTT value relative to the mobile device, e.g. how long it would take for a signal to travel from the mobile device 120a to another mobile device located at the boundary 205 and back again to the mobile device 120a.

The predetermined boundary 205 is shown as a circle surrounding the mobile device 120a and has a radius 210 (R). A reference RTT time for a signal to reach a mobile device and return to the source of the signal at the distance equal to radius 210 (R) from the mobile device 120a can be determined, and if the RTT for a signal sent between the mobile device 120a and another mobile device is less than or equal to the reference RTT value, the other mobile device is within the predetermined boundary 205 surrounding the mobile device 120a.

In the example illustrated in FIG. 2, the distance 215 (D1) between the mobile devices 120a and 120b is less than radius 210 (R) of the predetermined boundary 205, and the mobile device 120b falls within the predetermined boundary 205. Accordingly, the RTT for signals transmitted between the mobile device 120a and the mobile device 120b should be less than the reference RTT time. The distance 220 (D2) between mobile devices 120a and 120c is greater than the radius 210 (R) of the predetermined boundary 205, so mobile device 120c falls outside of the predetermined boundary 205. The RTT for a signal to travel between mobile device 120a and 120c will be greater than the reference RTT time. Accordingly, the presence of the mobile devices 120b and 120c within the predetermined boundary 205 can be determined by comparing the reference RTT time associated with the predetermined boundary 205 and the RTT times required for signals to travel between the mobile device 120a and the mobile devices 120b and 120c, respectively. One or more events can be triggered responsive to the presence of the mobile device 120b within the predetermined boundary 205 surrounding the mobile device 120a, and/or responsive to the mobile device 120b entering or exiting the predetermined boundary 205 surrounding the mobile device 120a.

Content Control

An illustrative example of the relative positioning techniques described herein is providing access to controlled electronic content based on the relative position of a mobile device 120 to a wireless access point 115 associated with the electronic content. For example, the relative positioning techniques can be used to control access to electronic content located on a company's network or on server 125 based on proximity of a mobile device to a wireless access point associated with the server 125. For example, access rights to documents or other electronic content located on the network 110 or one or more servers 125 can be granted based on the proximity of an employee's mobile device 120 to at least one wireless access point (e.g., wireless access point 115) configured to provide wireless network coverage for an area in which the electronic content can be accessed. The electronic content can comprise electronic copies of documents, books, text, music, video, and/or sound content, or other types of electronic content. The electronic content can also include executable software applications that can be executed on a mobile device. For example, the electronic content could include a copy of an electronic book (e-book) and/or games.

Figure 3:
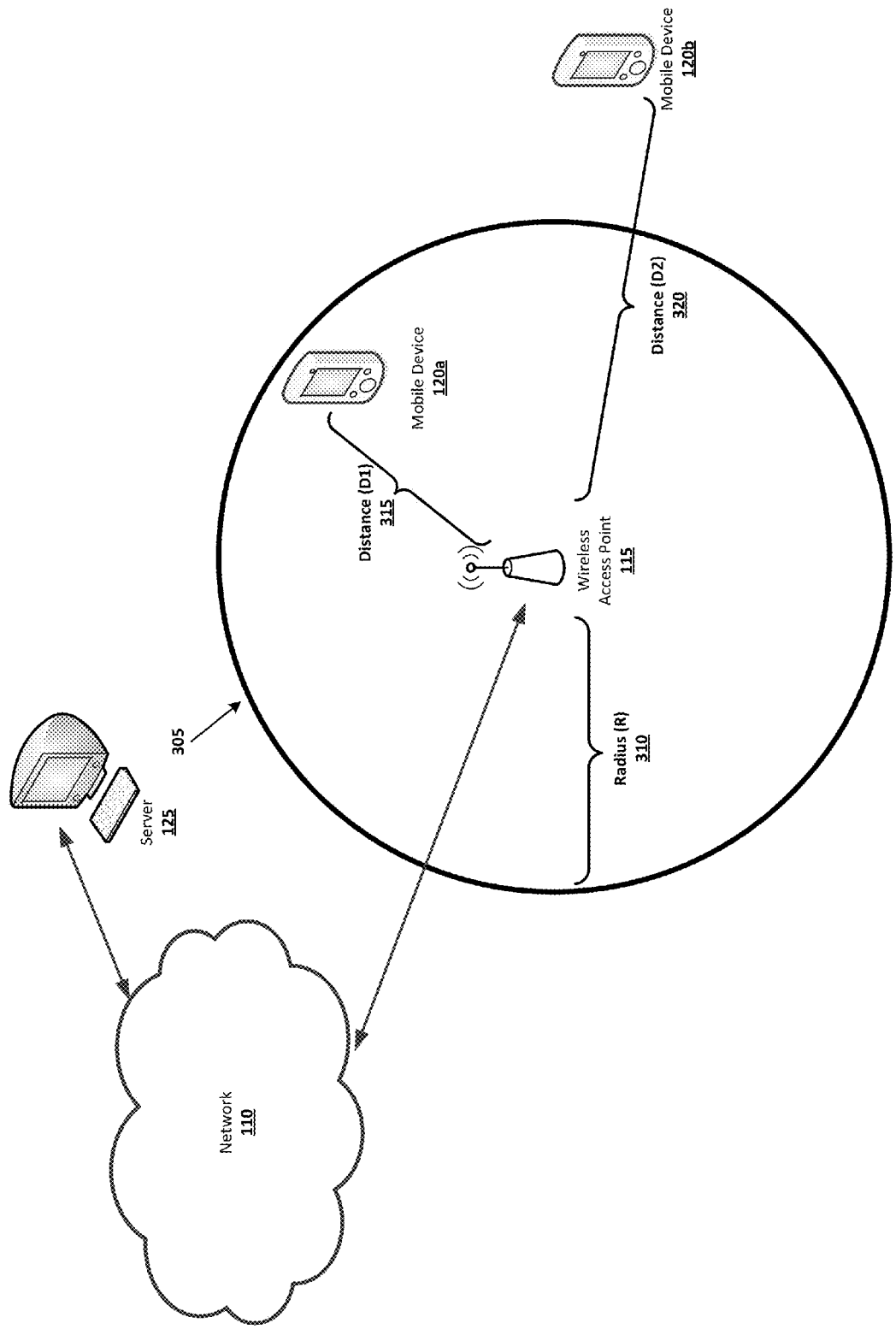
FIG. 3 is a diagram illustrating an example network environment that includes mobile devices and fixed wireless access points in which the relative positioning techniques discussed herein can be implemented.

Referring now to FIG. 3 to illustrate an example implementation of controlling content based on proximity, an employee whose mobile device 120 is within a predetermined boundary 305 of the wireless access point 115 could be granted access to the company's network content via the mobile device 120. The predetermined boundary 305 represents an area surrounding the wireless access point 115 that can move relative to the wireless access point 115 and can be represented as an RTT value relative to the wireless access point 115, e.g. how long it would take for a signal to travel from the wireless access point 115 to a mobile device located at the boundary 305 and back again to the wireless access point 115.

In this example, the mobile device 120a is distance D1 (315) from the wireless access point 115, which is less than the radius R (310) of the predetermined boundary 305. Accordingly, the RTT for signals to travel between the wireless access point 115 and the mobile device 120a and back again would be less than the RTT of signals to travel between the wireless access point 115 and the boundary 305 and back again. Mobile device 120a can be authorized to access content on the network based on its relative position to the wireless access point 115.

The mobile device 120a is distance D2 (320) from the wireless access point 115, which is greater than the radius R (310) of the predetermined boundary 305. Accordingly, the RTT for signals to travel between the wireless access point 115 and the mobile device 120b and back again would be greater than the RTT of signals to travel between the wireless access point 115 and the boundary 305 and back again. Accordingly, the mobile device 120b would not be permitted to access content on the network, because the relative position of the mobile device 120b to the wireless access point 115 is outside of the predetermined boundary 305 surrounding the wireless access point 115 in which access to the electronic content may be authorized.

Conventional techniques, such as geo-fencing, could be used to control access to content. However, these conventional techniques require that the actual locations of the mobile device 120a and the wireless access point 115 be determined, and the locations of the mobile device 120a be compared to the location of the wireless access point 115 to determine whether the mobile device 120a is located within the predetermined boundary 305. The locations of the mobile devices 120a and wireless access point 115 would need to be determined using absolute positioning techniques, by obtaining absolute positioning information, such as that obtained from a Global Positioning System (GPS) or other Global Navigation Satellite System (GNSS), or by using trilateration or triangulation techniques to determine the location of the mobile device 120 and/or the wireless access point 115. In contrast, using the relative positioning techniques disclosed herein, the positions of the wireless access point 115 and the mobile device 120a would not need to be determined. Furthermore, conventional geo-fencing techniques require that the position of the mobile device 120a be determined by the either by the mobile device, through assistance provided by the wireless communication network, or through a combination of actions by the mobile device and network assistance. Position determination requires additional equipment, processor power, and consumes precious battery power on the mobile devices. The relative positioning techniques described herein can reduce power consumption and latency and can reduce the cost of a mobile device as the mobile device would not need to include Satellite Positioning System (SPS) receivers or other equipment to determine the absolute location of the mobile device.

Referring back to FIG. 3, the RTT of signals transmitted between the mobile device 120a and the wireless access point 115 can be measured to determine whether content associated with the wireless access point 115 can be shared with the mobile device 120a. The RTT measurements can be compared to a reference value associated with predetermined boundary 305 to determine whether the mobile device 120a is within the predetermined boundary 305 surrounding the wireless access point 115 to determine whether the mobile device 120a may be granted access to electronic content associated with the wireless access point 115. The absolute locations of the mobile device 120 or the wireless access point 115 need not be known or determined.

The RTT measurements can also be converted to a distance between the mobile device 120 and the wireless access point 115 and whether to grant the mobile device 120 access to the electronic content associated with the wireless access point 115 can be conditioned on the distance between the mobile device 120 and the wireless access point 115a. The mobile device 120 can be configured to send a signal to the wireless access point 120 and to receive a response from the wireless access point 120, and based on the RTT of this signal, the mobile device 120 can be configured to determine how far the mobile device is from the wireless access point 120. The wireless access point 115 can also be configured to send a signal to the mobile device 120 and to receive a response from the mobile device 120, and based on the RTT for the signal, the wireless access point 115 can determine how far the mobile device 120 is from the wireless access point 115.

The packet generation and acknowledgement functions used to implement these techniques can be based on the IEEE 802.11 standards for wireless local area networks (WLANs). According to the IEEE 802.11 standards, a unicast data packet should be immediately (or a quickly as possible) be acknowledged by the receiver. For example, an Internet Control Message Protocol (ICMP) ping can transmitted by either the wireless access point 115 or the mobile device 120 to determine the RTT between the wireless access point 115 and the mobile device 120, which can then be used to determine a distance between the wireless access point 115 and the mobile device 120.

The wireless access point 115 and/or the server 125 can be configured to provide authentication to ensure that only authorized users are able to gain access to the electronic content. For example, measured RTTa Media Access Control (MAC) addresses of the authorized mobile devices, such as mobile device 120, could be stored in a database on the corporate network, e.g. network 110, or on the server 125 and the MAC address of mobile devices 120 entering into the predetermined boundary 305 could be authenticated against the list of authorized devices before access to content is authorized. Furthermore, the user of the mobile device could be required to login using authentication credentials, such as a username and password, to thwart attempts to access the confidential materials on the network using a stolen mobile device.

In another example, the relative positioning techniques described herein can be used to grant access rights to exams in a school or university setting. Referring once again to FIG. 3, a student could bring his or her laptop computer (mobile device 120a) to an exam room in which the wireless access point 115 is located. While the laptop computer (mobile device 120a) is within the predetermined boundary 305 associated with the wireless access point 115, the laptop computer (mobile device 120a) could be granted access to the exam content. The wireless access point 115 may also be configured to limit the laptop computer (mobile device 120a) from accessing content outside of the school's network during an exam. For example, students could be prevented from accessing content from the Internet during the examination. In the example illustrated in FIG. 3, the mobile device 120b is outside of the predetermined boundary 305 in which the electronic content can be accessed and the mobile device 120b would not be granted access to the exam contents.

In another example, the relative positioning techniques described herein could also be used by libraries to control access to electronic contents. Patrons within the predetermined boundary 305 from the wireless access point 115 could be granted access to electronic content on the library's network. Mobile device 120a could access this content but mobile device 120b would not be able to access this content.

In a variation of the library example described above, a museum could employ the relative positioning techniques described herein to provide content to mobile devices carried by patrons of the museum. For example, rooms or sections of a museum could have a wireless access point 115 associated with them that provides content to the mobile devices within a predetermined boundary 305 associated with the wireless access point 115. For example, a user entering a room of the museum could access information about art displayed in that room. The electronic content about the art displayed in that particular room or section of the museum could be pushed to the mobile device of the user when the mobile device enters the predetermined boundary 305 surrounding the wireless access point 115. The mobile device 120a can be configured to send to the wireless access point 115 for available content, and the mobile device 120a can determine whether to provide the electronic content to the mobile device 120a based on RTT measurements for signals transmitted between the mobile device 120a to the wireless access point 115. In the example illustrated in FIG. 3, the wireless access point 115 could be configured to determine whether the mobile device 120a is within the predetermined boundary 305 and to provide the requested content to the mobile device 120a if the mobile device 120a is within the predetermined boundary 305. Which electronic content to provide to the mobile device 120 can also be based on the location of the wireless access point 115, such as content related to artwork within a particular room of a museum. In another example, the electronic content provided could be of a general nature that covers the entire museum as well. The electronic content can also be selected at least in part based on user selections received a request from the mobile device 120.

The wireless access point 115 can be configured to push a directory or listing of available content to the mobile device 120a when the mobile device 120a enter the predetermined boundary 305 associated with the wireless access point 115. The mobile device 120a can also be configured to request a directory or listing of available content from the wireless access point 115 while the mobile device 120a has entered or is within the predetermined boundary 305 surrounding the wireless access point 115. The wireless access point 115 can determine that the mobile device 120b is outside of the predetermined boundary 305 based on the RTT between the mobile device 120b and the wireless access point 115 and would not automatically push directory or listing of available content to the mobile device 120b. If the mobile device 120b were to move within the predetermined boundary 305 surrounding the wireless access point 115, the wireless access point 115 may then provide the directory or listing of available content to the mobile device 120b either by automatically pushing the electronic content to the mobile device 120b or in response to a request for the electronic content received from the mobile device 120b.

Figure 10:
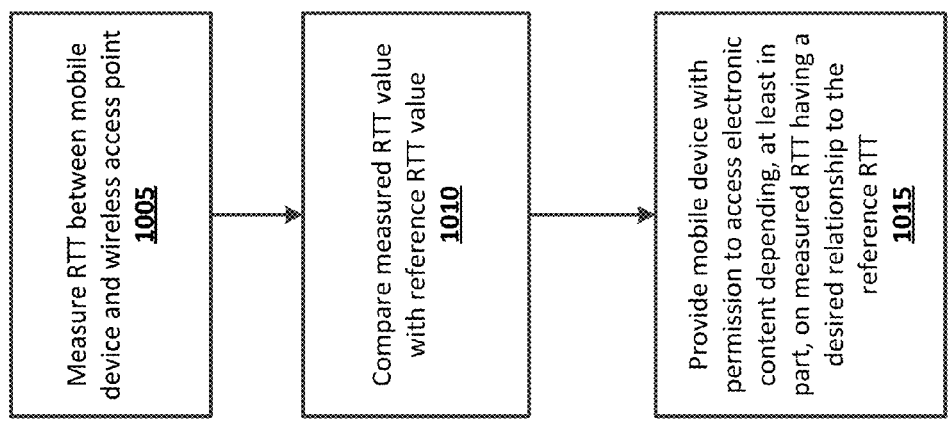
FIG. 10 is a flow diagram of a process for controlling access to electronic content based on relative positioning of a first mobile device to one or more wireless access points.

FIG. 10 is a flow diagram of a process for controlling access to electronic content based on relative positioning of a mobile device 120 to one or more wireless access points 115. The method illustrated in FIG. 10 can be implemented in a mobile device 120, a wireless access point 115, or a combination thereof. In some implementations, RTT method can be implemented by a remote computer system, such as server 125, which is in communication with the wireless access point 115 via the network 110.

The method of FIG. 10 includes measuring a round-trip time (RTT) associated with a signal transmitted between a mobile device and a wireless access point (stage 1005). Where the method is implemented in the mobile device 120, the mobile device 120 can send a first signal to the wireless access point 115, receive a second signal from the wireless access point 115 in response to the first signal, and determine a RTT for the signal based on the time that the first signal was transmitted by the wireless access point 115 and the time that the second signal was received by the mobile device 120. Where the method is implemented in the wireless access point 115, the wireless access point 115 can send a first signal to the mobile device 120, receive a second signal from the mobile device 120 in response to the first signal, and determine a RTT for the signal based on the time that the first signal was transmitted by the mobile device 120 and the time that the second signal was received by the wireless access point 115.

The method of FIG. 10 continues with comparing the measured RTT value with a reference RTT value (stage 1010). The reference RTT value can be received from the server 125 and stored on the mobile device 120 or the wireless access point 115, depending upon which device is performing the content control methods. The reference RTT value can also be installed on the mobile device 120 or the wireless access point 115 at the time that the device is manufactured or when the device is configured by the manufacturer or a reseller, such as a network service provider. The reference RTT value can also be configurable by an administrator of the electronic content. For example, an access configuration interface can be provided to allow a user to define the RTT reference values associated with particular content and other parameters, such as when, where, and whom can access content.

Returning to the examination example discussed above, an examinations administrator, teacher, or other user authorized to set up examination content for a school could log into an examination configuration interface provided by the server 125. The examination configuration interface can be configured to provide an interface that allows the user to upload examination content, to identify a date and/or time window during which the examination content is to be made available, to identify one or more users and/or user devices permitted to access the examination content during the date and/or time window during which the examination content is to be available, to identify one or more wireless access points 115 from which the electronic content should be accessible, and to define the predetermined boundary 305 surrounding the wireless access points 115. The predetermined boundary 305 can be defined as maximum distance or radius from the wireless access point 115 that the mobile device 120 can be and still be permitted to access the examination content, and the distance or radius can be translated into a corresponding RTT reference values that can be compared to measured RTT values.

The method of FIG. 10 continues with providing the mobile device 120 with permission to access the electronic content depending, at least in part, on the reference RTT value having a desired relationship to the reference RTT value (stage 1015). For example, the mobile device 120 can be provided permission to access the electronic content if the measured RTT value is less than the RTT reference value or if the measured RTT values is less than or equal to the RTT reference value. Alternatively, in other implementations, the mobile device 120 can be provided permission to access the electronic content if the measured RTT value is greater than the RTT reference value or if the measured RTT values is greater than or equal to the RTT reference value Where the method is implemented in a wireless access point 115, the wireless access point can send a message to server 125 indicating that the mobile device 120 can access electronic content associated with the wireless access point 115. The message can specify specific content that the mobile device 120 has permission to access or can provide permission for the mobile device 120 to access any content associated with the wireless access point 120. The message to the server 125 can also specify specific electronic content that was requested by the mobile device 120.

The wireless access point 115 can also be configured to push the electronic content to the mobile device 120. The wireless access point 115 can also be configured to transmit a signal to the mobile device 120 that includes a directory of available content, and the mobile device 120 can be configured to display the directory of available content to the user and to provide an interface that allows a user of the mobile device 120 to download the electronic content to the mobile device 120. The wireless access point 115 can also be configured to transmit the electronic content to the mobile device 120 in response to the mobile device 120 requesting the electronic content. The wireless device 120 can also be configured to transmit a link to the electronic content, such as a Uniform Resource Locator (URL) or Uniform Resource Identified (URI), which the mobile device 120 can follow to access the electronic content, such as from server 125. Where the method is implemented on the mobile device, the mobile device 120 can be configured to request a directory of available content and RTT reference data from the wireless access point 115 and to make a determination whether the relative position of the mobile device 120 is close enough to the wireless access point that the RTT between the mobile device 120 and the wireless access point 115 is less than or equal to the RTT reference value. The electronic content may be stored at the wireless access point 115, on the server 125, on the network 110, or at another remote location accessible to the wireless access point 115 via the network 110.

Where the method is implemented in the mobile device 120, the mobile device 120 can be configured to send a message granting permission to access the electronic content to the wireless access point 115 and/or the server 125 to indicate that the mobile device 120 should have access to the electronic content. To ensure that such messages are not spoofed or otherwise sent to the wireless access point 115 or to the server 125 by devices that are not entitled to access the electronic content, the mobile device 120 can encrypt the message content using an encryption key provided by the wireless access point 115 or the server 125.

Content Sharing

In a variation of the library example described above, the relative positioning techniques disclosed herein can be used to allow a user of a first mobile device to share electronic content with the user of a second mobile device. The RTT of a signal transmitted between the first device and the second device can be measured to determine whether content on the first device may be shared with the second mobile device. Using RTT measurements to determine whether the electronic content can be shared between the first and second mobile devices does not require that the locations of the first and second mobile devices be known or even that the distance between the first and second mobile device be determined. Instead, the RTT can be measured and compared to a reference RTT value to determine whether the electronic content can be shared between the devices. In some implementations, the RTT measurements can be converted to a distance between the first and second mobile devices and access to the electronic content on the first mobile device by the second mobile device can be conditioned on a distance between the first and second mobile devices.

Conventional techniques, such as geo-fencing, could be used to control access to content. However, the conventional techniques would require that the actual locations of the first and second mobile devices be determined and the locations would then have to be compared to determine whether the second mobile device had entered into a virtual perimeter surrounding first mobile device. Accordingly, the locations of the first and second mobile devices would either need to be determined by the devices themselves, through assistance by the wireless communication network, or through a combination of actions by the device and network assistance. Position determination requires additional equipment, processor power, and consumes precious battery power on the mobile devices. The RTT techniques described herein can reduce power consumption and latency and can reduce the cost of the mobile devices 120 as the mobile devices 120 would not need to include Satellite Positioning System (SPS) receivers or other equipment to determine the location of the mobile devices 120.

The electronic content can comprise electronic copies of documents, books, text, music, video, and/or sound content, or other types of electronic content. The electronic content can also include executable software applications that can be executed on a mobile device. For example, the electronic content could include a copy of an electronic book (e-book) and/or games. In some variations, the electronic content can be transmitted from the mobile device 120 that includes the electronic content to be shared to another mobile device 120 capable of receiving the shared content either direction or via one or more intermediate networks. In a variation, the shared content can be pushed from the first mobile device 120*a* to the second mobile device 120*b*. In another variation, first mobile device 120a can authorize the second mobile device 120b to access the shared content, and the second mobile device 120b can download the shared content from the first mobile device 120a or from a remove server 125 either directly or via one or more intermediate networks, such as network 110. In such an implementation, the electronic content is not actually transmitted from one mobile device to another. Instead, the first device can authorize the sharing and sends a message to a content server, such as server 125, the second device can then request the electronic content from the content server or the content server can be configured to push the electronic content to the second mobile device.

For example, a user having an electronic copy of a book on her tablet could share the contents of the electronic copy of the book with a friend if the friend's mobile device if proximate to the user's tablet. In one implementation, the user's tablet could be configured to make RTT measurements of a signal transmitted between the user's tablet and the friend's mobile device and allow the friend's mobile device access to content on the tablet if the RTT measurements are less than or equal to a reference RTT measurement. The RTT measurements can also be converted into a distance between the user's tablet and the friend's mobile device to determine whether the friend's mobile devices is within a predetermined distance from the tablet in order to access the electronic content on the tablet. The friend can view a copy of the book on his or her mobile device while within the predetermined distance of the user who owns a copy of the book. The tablet can be configured to repeatedly measure the RTT between the tablet and the friend's mobile device to ensure that the friend's mobile device is still proximate to the tablet.

Referring back to FIG. 2, the user of mobile device 120a has a copy of electronic content on her tablet. A friend using mobile device 120b could view a copy of the electronic content while the friend remains within the predetermined boundary 205 surrounding the user's mobile device 120a. Another friend using mobile device 120c is outside of the predetermined boundary 205 and would not be granted access to share the electronic content on mobile device 120a. In some implementations, the mobile device 120a may be configured to share electronic content with multiple users simultaneous. For example, a teacher could share content on his tablet computer with students having tablet computers in his classroom.

The mobile devices 120a and 120b can be configured such that sharing of the electronic content may be initiated by bringing the mobile device 120a that has the electronic content that can be shared within a predetermined proximity of a second mobile device 120b with which the electronic content is to be shared. For example, the mobile device 120a illustrated in FIG. 2 can be configured to enable sharing of electronic content with mobile device 120b which is within the predetermined boundary 205 associated with the mobile device 120a. The proximity of the mobile devices can be determined by comparing RTT measurements to a reference RTT value or by converting the RTT measurements to a distance between the mobile devices. The mobile device 120a that has the electronic content that can be shared can run an application that repeatedly sends out a "ping" to determine whether any other mobile devices (e.g., mobile devices 120b and 120c) are within a predetermined distance from the mobile device 120a. The predetermined distance for sharing can also be less than the predetermined boundary 205 surrounding the mobile device. For example, the mobile devices 120a and 120b may need to be brought within a few inches of one another to initiate the sharing of content, but the electronic content may continue to be shared even if the users stay within a predetermined distance of each other. This concept can be illustrated by returning to the classroom example discussed above. To activate the sharing of content from the teacher's mobile device 120a to the mobile devices 120b and 120c of the students, the students may need to bring their mobile devices within a couple of feet of the mobile device 120a of the teacher, but once the electronic content has been shared, the mobile devices 120b and 120c of the students could return to their seats throughout the classroom to make use of the shared electronic content.

The mobile device 120a that includes the electronic content to be shared may include a user interface that allows a user of the mobile device 120a to select content stored on the mobile device 120a or on a remote server, such as server 125, to be shared with the other mobile devices (e.g., mobile device 120b and mobile device 120c). The mobile device 120a can be configured to alert a user of the device 120a when another mobile device 120b is proximate to the mobile device 120a and prompt the user whether the user would like to share content with the other mobile device 120b.

The mobile device 120a of the user who has content that can be shared can be configured to provide a control mechanism that places the mobile device 120a in a sharing mode or in a non-sharing mode. While in the sharing mode, the mobile device 120a can share electronic content with other mobile devices proximate to the mobile device 120a.

The mobile device 120a can also be configured to allow the user to select which content should be shared with which other mobile devices, such as mobile device 120b and mobile device 120c. For example, returning the classroom example described above, a teacher who is working with a group of students at different reading levels could share different content with different groups of students based on their reading level. The user of mobile device 120a can be presented with an option to allow the electronic content to be shared or to prevent the sharing of the electronic content with particular devices.

The mobile device 120a can be configured to advertise to nearby devices that content is available to be shared. For example, referring to FIG. 2, as mobile device 120b enters the predetermined boundary 205 surrounding the mobile device 120a, the mobile device 120a can be configured to send a message to mobile device 120b that mobile device 120a has content available to be shared.

The receiving mobile device 120b can include a user interface that allows a user of the device control which content is received and/or requested from mobile device 120a that has content to be shared. The mobile device 120b can be configured to include a user interface that prompts a user of the device that mobile device 120a has content to be shared. The user interface of mobile device 120b can be configured to receive a directory of content from the mobile device 120a that is available for sharing and the user interface allows a user to select content to be shared with mobile device 120b.

Figure 11:
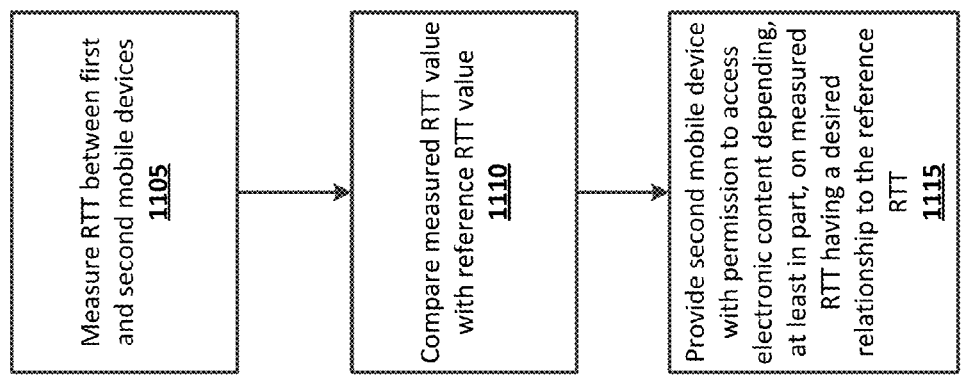
FIG. 11 is a flow diagram of a process for sharing electronic content based on relative positioning of a first mobile device to a second mobile device.

FIG. 11 is a flow diagram of a process for sharing electronic content based on relative positioning of a first mobile device 120a to a second mobile device 120b. The method includes measuring a round-trip time (RTT) associated with a signal transmitted between the first mobile device 120a and the second mobile device 120b (stage 1105). For example, a first mobile device 120a can be configured to send a first signal to the second mobile device 120b, to receive a second signal from the second mobile device 120b in response to the first signal, and to determine a RTT for the signals based on the time that the first signal was transmitted by the first mobile device 120a and the time that the second signal was received by the mobile device 120b.

The method of FIG. 11 includes comparing the measured RTT value with an RTT reference value (stage 1110). The reference RTT measurement can be predetermined and stored on the first mobile device. The reference RTT measurements can also be obtained from a network, such as from server 125 illustrated in FIG. 1. The RTT reference information may be determined, at least in part, based on user input received from the user of the mobile device that has content to be shared. The mobile device 120 can be configured to include an access configuration interface that provides an interface that allows the user of a mobile device 120a to define the RTT reference values associated with particular content and other parameters, such as when, where, and whom can access content. For example, the access configuration interface can allow the user to define how close another mobile device 120b must be to the user's mobile device 120a in order to be able to access the electronic content on or associated with the user's mobile device 120a. For example, a first user might select a threshold of 6 feet or 2 meters as the maximum distance that a second user's mobile device would need to be from the first user's mobile device in order for the second user's mobile device to access shared content.

The method of FIG. 11 includes providing permission to access the electronic content on or associated with the first mobile device 120a to the second mobile device 120b depending, at least in part, on the measured RTT value having a desired relationship to the RTT reference value (stage 1115). For example, the first mobile device 120a can be configured to provide permission to access the electronic if the measured RTT value is less than the reference RTT value or less than or equal to the reference RTT value. Alternatively, the first mobile device 120a can be configured to provide permission to access the electronic content on or associated with the first mobile device 120a if the measured RTT greater than the RTT reference value or greater than or equal to the reference RTT value.

The first mobile device 120a can be configured to send a message granting permission to access the electronic content to the mobile device 120b and/or the server 125 to indicate that the mobile device 120b should have access to the electronic content. To ensure that such messages are not spoofed or otherwise sent to the server 125 by devices that are not entitled to access the electronic content, the mobile device 120a can encrypt the message content using an encryption key provided by the server 125. The message can include instructions for retrieving the electronic content, which could be stored on the network 110, the server 125, and/or the first mobile device 120a. The second mobile device 120b can then access the electronic content for which permission was granted.

The first mobile device 120a can also be configured to push the electronic content to the second mobile device 120b. The first mobile device 120a can also be configured to transmit a signal to the second mobile device 120b that includes a directory of available content, and the second mobile device 120b can be configured to display the directory of available content to the user and to provide an interface that allows a user of the second mobile device 120b to download the electronic content to the mobile device 120b. Where the method is implemented on the mobile device 120a, The mobile device 120a can be configured to request a directory of available content associated with the mobile device 120a and RTT reference data from the wireless access point 115 and to make a determination whether the relative position of the mobile device 120b is close enough to the position of mobile device 120a that the RTT between the first mobile device 120a and the second mobile device 120b is less than or equal to the RTT reference value. The electronic content may be stored at the mobile device 120a, wireless access point 115, on the server 125, on the network 110, or at another remote location accessible to the mobile device 120a via the network 110. The mobile device 120a can also be configured to transmit a link the mobile device 120b, such as a Uniform Resource Locator (URL) or Uniform Resource Identified (URI), which the mobile device 120b can follow to access the electronic content, such as from server 125.

The method of FIG. 11 can also include converting the RTT measurements to a distance between the first and second mobile devices and comparing the determined distance to a reference distance to determine whether the second mobile device should have access to the electronic content on the first mobile device.

Friend Finder

An illustrative example of the relative positioning techniques described herein is a friend finder application. The example diagram of mobile devices illustrated in FIG. 1 can be used to illustrate this example. When mobile device 120a detects the mobile devices 120b and 120c proximate to the device, the mobile device 120a can send an RTT message to the mobile devices 120b and 120c and based on the round trip times associated with the messages determine the distances D1 and D2. The RTT message can comprise an Internet Control Messaging Protocol (ICMP) Echo Request Message and an ICMP Echo Response can be provided in response to the request message. The time required for the response to be received can then be used to estimate the distance between the nodes.

When a mobile device, such as mobile device 120a detects that mobile device 120b is enters or is within the predetermined boundary 205 based on the RTT of the message to the mobile device 120b, the mobile device 120a can determine the MAC address of the mobile device 120b. For example, the predetermined boundary 205 may be a predetermined boundary of 5 meters from the user. The mobile device 120a can prompt a user whether the user would like to add the mobile device to a list of "friends" that will be tracked from now. The mobile device 120a can be configured to notify the user of the mobile device 120a if the user of the mobile device 120b is nearby (e.g. within the predetermined boundary) from the user.

Virtual Leash for Pets or Child Tracker

An illustrative example of the relative positioning techniques described herein is a virtual leash for pets or a child tracker that can be used to track the position of a child or a pet to alert someone if a child or pet strays too far away from a parent or guardian. For example, a mobile device could be attached to or integrated into a pet's collar to keep track of a pet. In another example, a child could be provided with a mobile device or a mobile device could be integrated or attached to a piece of clothing worn by the child. For example, a child could be given a watch-like wrist band that includes a mobile device that is capable of communicating on a wireless network. The mobile device could be configured to provide for either one or two way voice communications and for other services, or the device could be configured only for tracking purposes.

Referring to FIG. 1, if the mobile device 120a could be configured to track the presences of the mobile devices 120b and 120c. For example, the mobile devices 120b and 120c could be used to track the user's two children. If the children move outside of the predetermined boundary 205 around the mobile device 120a, the mobile device 120a can be configured to generate a warning to the user of the mobile device 120a. For example, the mobile device 120c is outside of the predetermined boundary 205 around the mobile device 120a. The mobile device 120a could generate a warning to alert the parent or guardian. The mobile device 120a could also be configured to send an alert to the mobile device 120c warning the child that he or she has strayed too far from their parent or guardian.

Locating a Parked Car

An illustrative example of the relative positioning techniques described herein to help a user locate their parked car. The car preferably includes a wireless access point. The owner of the car can be alerted when the access point associated with the vehicle is within a predetermined distance from the user's mobile device using RTT measurements transmitted between the mobile device and the access point in the car.

Vehicle to Vehicle Distance Monitoring

An illustrative example of the relative positioning techniques described herein can be used to monitor the distance between vehicles traveling on a road and to take action based on the relative distance between the vehicles if necessary. If two vehicles both have Wi-Fi (DSRC) and RTT capability, the vehicles can be configured to use RTT or other relative positioning methods to determine how far apart the vehicles are to determine whether the vehicles are traveling at a safe distance from one another.

The safety distance between vehicles can be monitored much faster and more reliably than having GPS on board of each vehicle, and a protocol to exchange positions for relative position computation.

Figure 4:
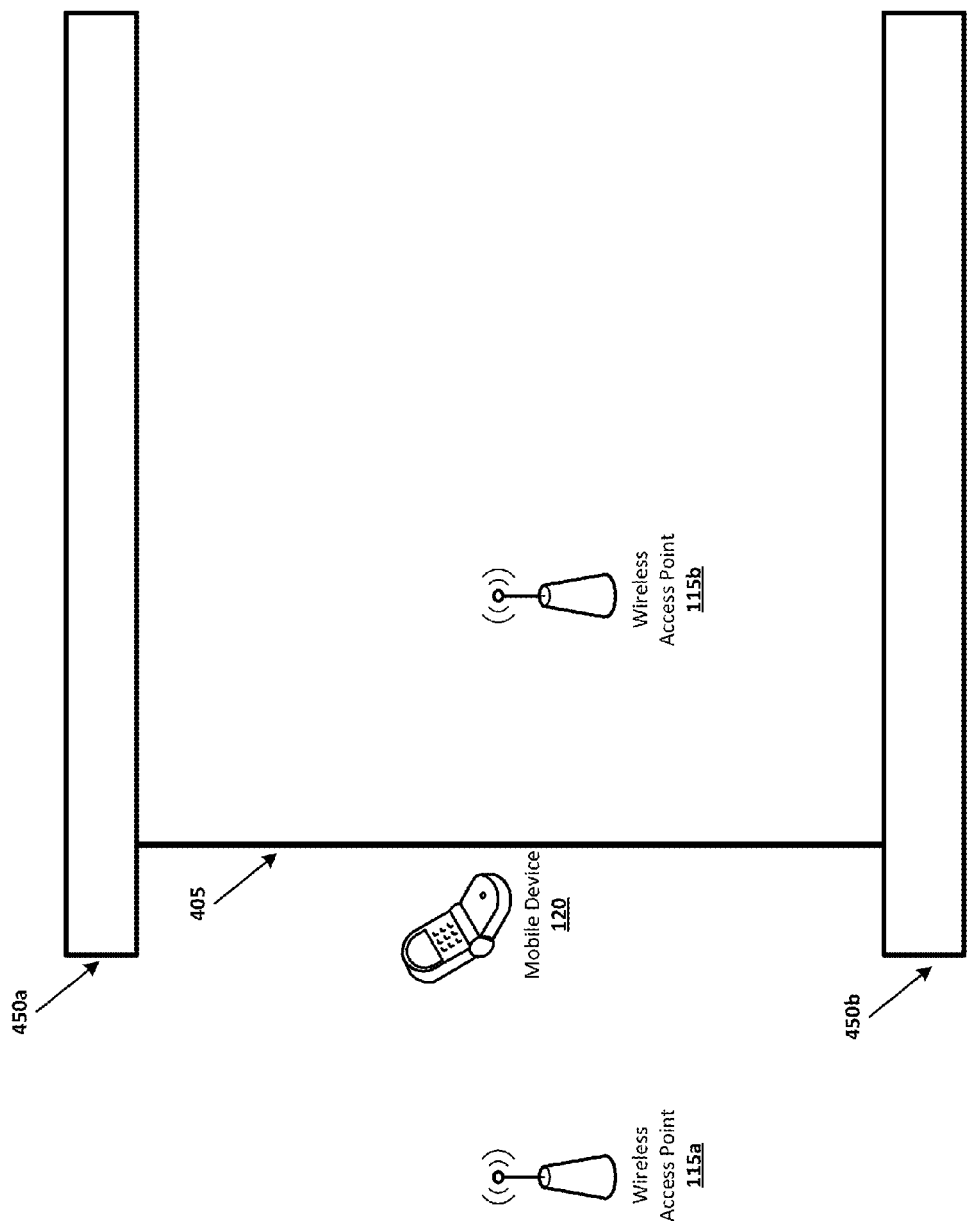
FIG. 4 is a diagram illustrating an example network environment that includes mobile devices and fixed wireless access points in which the relative positioning techniques discussed herein can be implemented.

Three Nodes—Proximity Detection and Line Crossing Detection with Direction of Crossing Another illustrative relative positioning technique includes two wireless access point nodes that preferably use RTT information or other relative positioning information to determine whether a third mobile device node has crossed a perimeter or boundary defined by the two wireless access points. Alternatively, the mobile device can be configured to use RTT information to determine whether the mobile device has crossed a perimeter or boundary defined by two or more wireless access points. The relative position of the mobile device is monitored, and if it is detected that the mobile device has crossed a line defined by the perpendicular bisector between the two fixed position wireless access points, an event can be triggered. FIG. 4 illustrates an example of such an implementation. The mobile device 120 is located within the overlapping coverage areas of wireless access points 115a and 115b. The boundary 405 is located between the wireless access points 115a and 115b. In the examples described herein, the wireless access points 115a and 115b can be fixed wireless access points, mobile wireless access points, or a combination thereof. One example implementation where mobile wireless access points might be used is in a battlefield scenario where the movement of troops and/or equipment is tracked relative to a moveable boundary. Another application where mobile wireless access points might be used is in a virtual sporting event or a virtual playing field were the movement of players and/or balls or other equipment may be tracked relative to movable boundaries.

A barrier or barriers may limit the length of the boundary 405, such as barriers 450a and 450b. The barriers can be various types of structures, such as walls, doorways, or other structures that can define an area. For example, the barriers 450a and 450b could represent the sides of a tollbooth, the sides of a roadway, the sides of a tunnel, the sides of a doorway to a store or other building, the sides of an entranceway to a parking structure or other car park. Other types of barriers 450 that might be used will be apparent from the various examples discussed below. The barriers 450 can serve to limit the length of the boundary 405 and/or to control the flow of pedestrian or vehicle traffic to cause the flow of traffic to cross the boundary 405 when entering or exiting a controlled access area.

Figure 8:
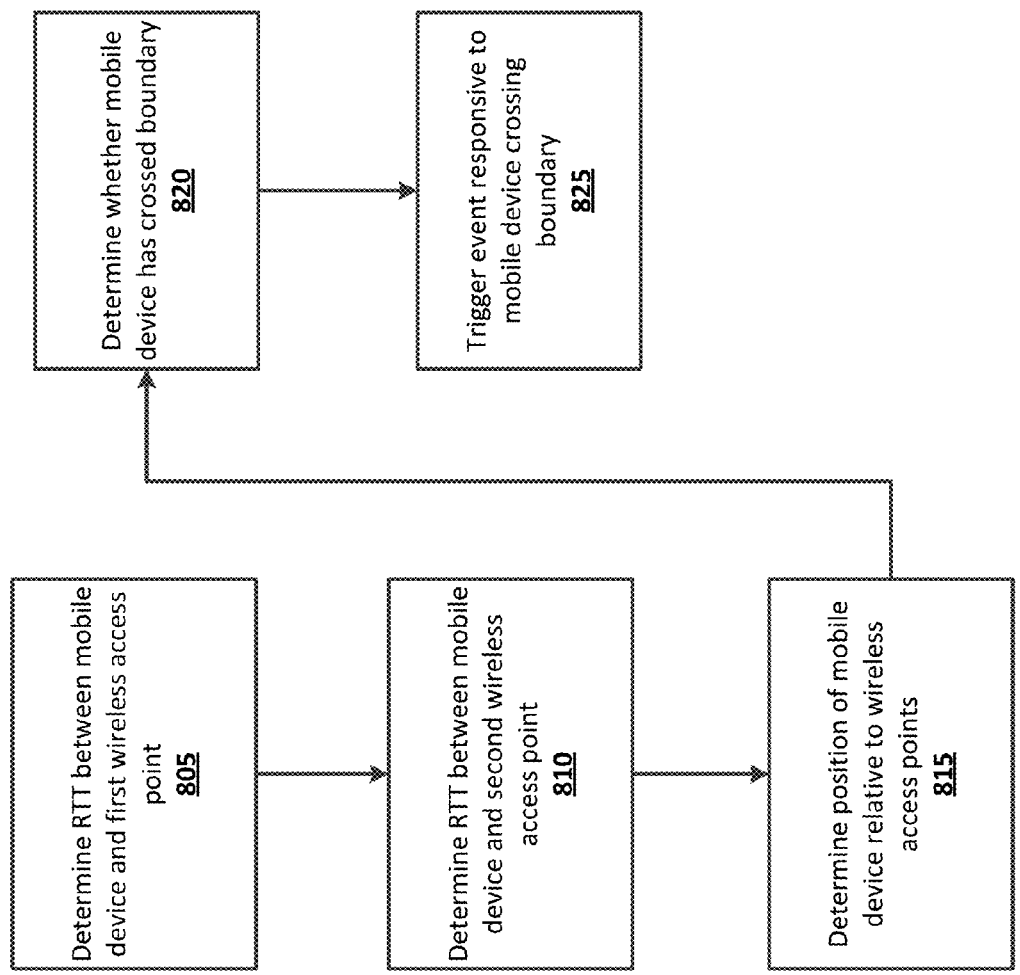
FIG. 8. is a flow diagram of a process for determining whether a mobile device crosses a boundary defined by a first wireless access point and a second wireless access point.

FIG. 8. is a flow diagram of a process for determining whether a mobile device crosses a boundary defined by a first wireless access point 115a and a second wireless access point 115b. The first wireless access point 115a and/or the second wireless access point 115b can be fixed location wireless access points or can be mobile wireless access points depending upon the particular implementation. The method includes determining a first round trip time (RTT) representing an amount of time for a message to travel between the first wireless access point 115a to the mobile device 120 (stage 805) and determining a second RTT representing an amount of time for a message to travel between the second wireless access point 115b to the mobile device 120 (stage 810). The RTT between the first wireless access point 115a and the mobile device 120 can be determined by measuring the amount of time it takes for a signal to travel from the first wireless access point 115a and the mobile device 120 and for an acknowledgement to the signal to travel back from the mobile device 120 to the first wireless access point 115a. The RTT could also be measured where the first signal is transmitted from the mobile device 120 to the wireless access point 115a and the acknowledgement is transmitted by the wireless access point 115a to the mobile device 120. The second RTT can be measured in using similar techniques.

Figure 12:
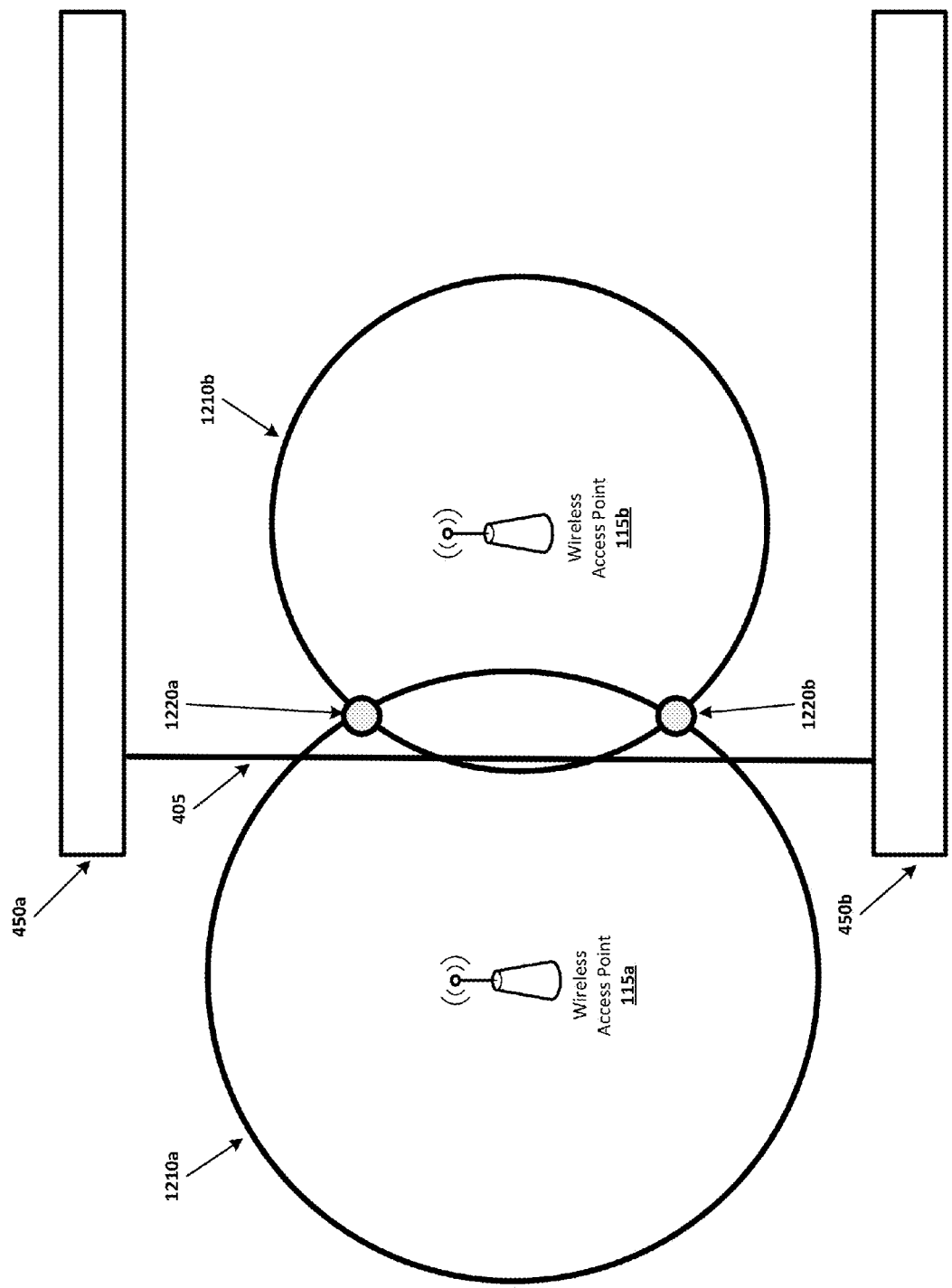
FIG. 12 is a block diagram illustrating the boundary crossing technique illustrated in FIG. 4.

The method also includes determining a position of the mobile device 120 relative to the first wireless access point 115a and the second wireless access point 115b (stage 815). The RTT measurements can be used to determine an approximate location of the mobile device 120 relative to the wireless access points 115a and 115b. FIGS. 12 and 13 illustrate this concept. FIG. 12 illustrates an example of the RTT measurements can be used to determine whether a mobile device 120 has crossed a line. In this example, a circle 1210a is centered over wireless access point 115a, and the radius of the circle 1210a can be determined from on the RTT measurements between the wireless access point 115a and the mobile device 120. A circle 1210b is centered over wireless access point 115b, and the radius of the circle 1210b can be determined from on the RTT measurements between the wireless access point 115b and the mobile device 120. As can be seen in FIG. 12, the position of the mobile device 120 relative to the wireless access points 115a and 115b can be one of two points of intersection 1220a or intersection 1220b. It is also possible that there could be a single point of intersection between the two circles, circle 1210a and circle 1210b, depending upon the position of the mobile device 120 relative to the wireless access points 115a and 115b. In the example illustrated in FIG. 12, the mobile device 120 has not yet crossed the boundary 405. In the example, illustrated in FIG. 13, the mobile device 120 has crossed the boundary 405.

The method also includes determining whether the mobile device 120 has crossed a boundary defined by the first wireless access point 115a and a second wireless access point 115b (stage 820). To determine whether the mobile device 120 has crossed the boundary 405, RTT values between the mobile device 120 and the first wireless access point 115a and RTT values between the mobile device 120 and the second wireless access point 115b can be repeatedly measured. An estimate of the direction of travel of the mobile device 120 and whether the mobile device 120 has crossed the boundary can be determined by computing the range difference between RTT measurements between wireless access point 115a and wireless access point 115b, and checking if this difference changes sign then stays constant. When referring to the direction that the mobile device 120 has crossed the boundary 405, we refer not to the vector along which the mobile device 120 is moving, but rather to the side of the boundary to which the mobile device 120 has moved. For example, has the mobile device 120 moved from the side of the boundary 405 closer to wireless access point 115a to the side of the boundary closer to wireless access point 115a, or vice versa. The direction of the crossing can be detected by checking if the RTT difference went from positive to negative or from negative to positive. According to an implementation, in order to have an unambiguous crossing point, the distance between wireless access point 115a and wireless access point 115b should be to be greater than 3 times the double of the RTT measurement error, and the mobile should be to be confined in a corridor along wireless access point 115a and wireless access point 115b direction. The same behavior can be obtained if the measurements are made triggered by the wireless access points or at the mobile triggered by the mobile. In the wireless access point triggered example, a central server can be configured to receive measurements of RTT from the wireless access point and the central server can perform the RTT computations.

The method also includes triggering an event responsive to the mobile device 120 crossing the boundary 405 (stage 825). Various types of events might be triggered as a result of the mobile device crossing the boundary 405. For example, electronic content could be pushed to the mobile device 120 from a server 125. If the boundary 405 is associated with a paid access area, a payment transaction could be initiated to pay for the content using an account associated with the mobile device 120. Various other types of events that may be triggered have been described in detail above.

For example, information about a particular space such as a room in a museum or a particular store in a shopping mall might be accessed or pushed to the mobile device 120 in response to the mobile device 120 crossing the boundary 405. In other implementations, the event could be that an admission for access to paid access area, such as a movie theater, a museum, or other location could be triggered when the mobile device 120 crosses the boundary in a particular direction. Other types of events that might be triggered are discussed in the various examples described below.

Figure 9:
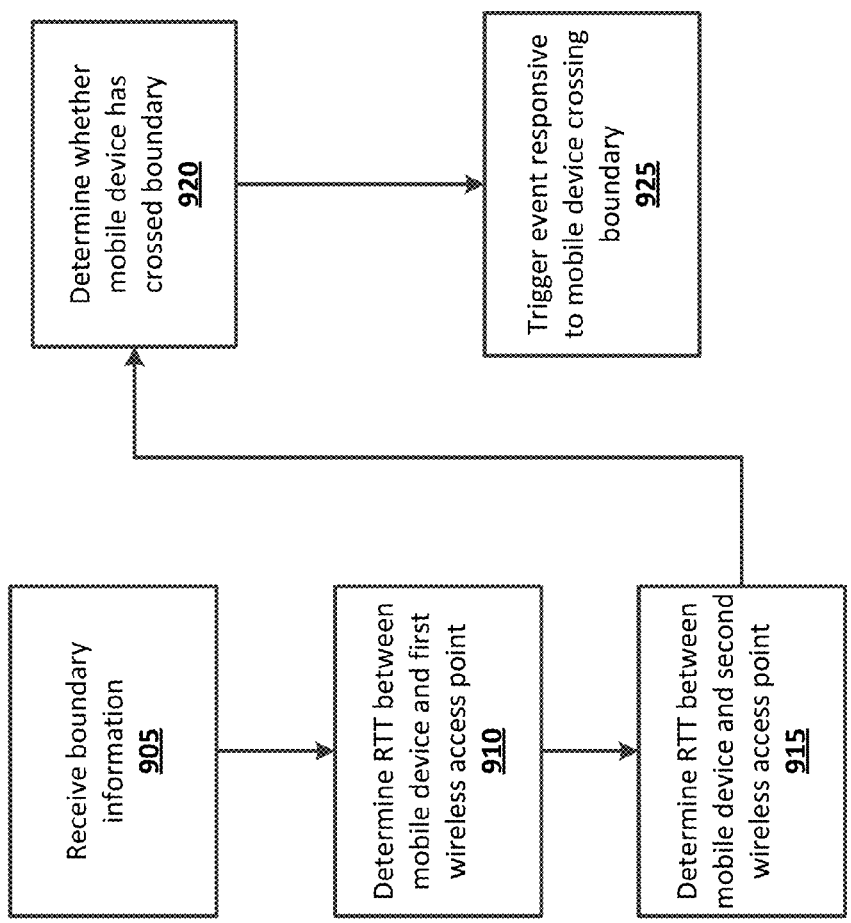
FIG. 9. is a flow diagram of a process for determining whether a mobile device crosses a boundary defined by a first wireless access point and a second wireless access point.

FIG. 9. is a flow diagram of another process for determining whether a mobile device 120 crosses a boundary defined by a first wireless access point 115a and a second wireless access point 115b. The method includes receiving, at the mobile device 120, information defining the boundary defined by the first wireless access point 115a and the second wireless access point 115b (stage 905). The boundary can be defined at least in part by based on a ratio of RTT measurements between a mobile device 120 and the first wireless access point 115a to RTT measurements between the mobile device 120 and the second wireless access point 115b. The boundary information can be defined and stored on the server 125, on the wireless access points 115a and/or 115b, and/or on the mobile device 120. The boundary information can be accessed from a memory stored on the mobile device or may be transmitted to the mobile device by at least one of the wireless access points 115a and/or 115b when the mobile device enters into the coverage area of the wireless access points 115a and/or 115b. The mobile device 120 can also be configured to request boundary information for a particular location. For example, the mobile device 120 can be configured to transmit a request for boundary information for a particular location, such as a shopping mall, a parking structure, or a museum when the mobile device 120 detects the presences of the wireless access points 115a and/or 115b.

The method also includes determining the ratio of the RTT between the mobile device 120 and the first wireless access point 115a to a ratio of the RTT between the mobile device 120 and the second wireless access point 115b (stage 910). The RTT between the mobile device 120 and the wireless access point 115a can be measured to determine a first RTT measurement, and the RTT between the mobile device 120 and the wireless access point 115b can be measured to determine a second RTT measurement. The ratio of the first RTT measurement to the second RTT measurement can be determined and this ratio can be used to determine whether the mobile device 120 has crossed the boundary (stage 915).

An event can be triggered responsive to the mobile device crossing the boundary (stage 925). The position of the mobile device relative to the boundary can be determined based on the ratio measured in the RTT between the mobile device 120 and the first wireless access point 115a to a ratio of the RTT between the mobile device 120 and the second wireless access point 115b and the ratio associated with the boundary. FIGS. 12 and 13 can be used to illustrate this concept. The relative position of the mobile device 120 to the boundary 405 can be determined based on the RTT measurements between the mobile device 120 and the wireless access points 115a and 115b. If the measured RTT ratio is greater than the RTT ratio associated with the boundary, then the mobile device is positioned to one side of the boundary. If the measured RTT ratio is less than the RTT ratio associated with the boundary, then the mobile device is positioned to the other side of the boundary. If the measured RTT ratio is equal to the RTT ratio associated with the boundary, then the mobile device is positioned on the boundary.

The method may also include determining a first RTT representing an amount of time for a message to travel between the first wireless access point 115a and the mobile device 120 and determining a second RTT representing an amount of time for a message to travel between the second wireless access point 115b and the mobile device 120. The method can also include determining a position of the mobile device 120 relative to the first wireless access point 115a and the second wireless access point 115b.

Various types of events might be triggered as a result of the mobile device crossing the boundary 405. For example, information about a particular space such as a room in a museum or a particular store in a shopping mall might be accessed or pushed to the mobile device 120 in response to the mobile device 120 crossing the boundary 405. In other implementations, the event could be that an admission for access to paid access area, such as a movie theater, a museum, or other location could be triggered when the mobile device 120 crosses the boundary in a particular direction. Other types of events that might be triggered are discussed in the various examples described below.

The mobile device 120 can be configured receive trigger event information and boundary information from a server 125. For example, the mobile device 120 may communicate with server 125 and/or other devices (not shown) via one or more networks 110 as illustrated in FIG. 1. The wireless access points 115a and 115b may also be configured to communicate with the server 125 and/or other devices (not shown) via one or more networks 110. The mobile device 120 can receive event trigger information and/or boundary information from the server 125. The server 125 may be operated by a wireless service provider that provides wireless mobile network access to the subscriber associated with mobile device 120 or could be a third party information provider. For example, the server 125 may be associated with a service provider, such as a movie theater, an airport, a pay parking lot, a museum, a toll road, an entertainment venue, or other service provider that tracks access to or from a particular controlled access area. For example, if the mobile device 120 crosses a boundary being monitored, the subscriber of the mobile device might be charged a usage fee for accessing the area being monitored. The service provider might also make information available to users of the mobile device 120 or push content to the mobile device 120 when the mobile device 120 crosses a boundary being monitored.

In some implementations, the boundary information can be defined at least in part based on a ratio of the RTT between the mobile device 120 and the first wireless access point 115a to a ratio of a RTT between the mobile device 120 and the second wireless access point 115b. The ratio used can vary from implementation to implementation, and different boundaries might be associated with different triggers. For example, a boarding area for a flight might be divided up into a priority boarding area and a regular boarding area using two boundaries defined using different ratios associated with the RTTs between the mobile device 120 and the wireless access points 115a and 115b. In this example, a first boundary associated with the priority boarding area and a second boundary associated with the regular boarding area could be used to determine when a user carrying his or her mobile device 120 has entered the priority boarding area or the regular boarding area for the flight and could be used to check the user into the flight, create a headcount of users in each of the boarding areas, or to perform some other function.

The mobile device 120 can also be configured to send RTT information collected by the mobile device to server 125, and the server 125 can be configured to determine whether the mobile device 120 has crossed boundary 405, and whether an event should be triggered in response to the mobile device 120 crossing the boundary 405. The server 125 can also be configured to collect RTT information from the wireless access points 115a and 115b to determine whether the mobile device 120 has crossed the boundary 405 rather than the mobile device 120 collecting the RTT information and determining whether the boundary 405 has been crossed.

In some implementations, the subscriber associated with the mobile device 120 may be required to enroll the mobile device 120 with the service provider so that the service provider can identify participating mobile devices. In some implementations, the subscriber associated with the mobile device 120 may also download one or more applications to the mobile device 120 that allow the mobile device to utilize the services provided by the service provider.

The following use cases illustrate the examples of the relative positioning techniques that use the relative positioning techniques to detect line crossing. These examples are not exhaustive and merely illustrate several possible implementations.

Vehicle Traffic Analysis

Any vehicle with an on-board passive RTT capable mobile can be used as a probe for vehicle traffic analysis. Better, as the direction can be determined by the sense of variation, only one set of wireless access points 115 can be used to simultaneously measure the traffic in both directions. A more classical FASTRACK system or equivalent would need one sensor per direction. For example, the barriers 450a and 450b illustrated in FIG. 5 can represent the edges of a roadway or lane in which a vehicle or vehicles might travel. The barriers 450a and 450b can also represent the side of a tollbooth, a tunnel, or other structure through which a vehicle or vehicles might pass and the traffic flow patterns across this point could be monitored. The mobile device 120 can in some instances be portable mobile device, such as a mobile phone, tablet computer, etc. that is associated with the user of the device or could be installed in a vehicle and associated with a particular vehicle. The mobile device 120 may be a wireless access point that is associated with the vehicle. The mobile device can be mounted on the vehicle and the first wireless access point and the second wireless access point can be mounted proximate and collinear to a roadway on which the vehicle is traveling.

Traffic in or Out of a Store

For pedestrian store traffic analysis, a set of two wireless access points, such as wireless access point 115a and wireless access point 115b, can unambiguously determine whether a mobile device 120 has entered or exited from door of a store (represented by the boundary 405 in FIG. 4). A set of wireless access points, such as wireless access point 115a and wireless access point 115b, could be attached at each door of the store for complete perimeter detection of pedestrian traffic that has a mobile device 120 that is configured to work with the techniques disclosed herein. The retailer could use the information obtained to determine peak shopping times, traffic flow patterns into and out of the store, or other information about the pedestrian traffic into and out of the store. The retailer could also make available content to users in the store, such as download able sale information and/or coupons that is only available to shoppers visiting a retail location. Content could be customized per retail location.

Pedestrian traffic could also be monitored within a store using these techniques. For example, a retailer might wish to analyze traffic through a department store by installing a pair of wireless access points 115 at the borders of various sections of the store in order analyze traffic through various parts of the department store.

The mobile device 120 can also be configured to trigger various events when the mobile device enters a store. For example, the mobile device 120 could be configured to request information about the store from a remote server via a wireless network connection. For example, the mobile device could request sale information and/or coupon information and display the electronic content to a user of the device. Other types of information could also be obtained. The mobile device 120 could also be configured to send a message to another mobile device 120 that the user of the mobile device has entered a particular store. This implementation could be used in conjunction with the "friend finder" applications described above.

Airport Check-in

The check-in line for a flight can be equipped with two wireless access points, wireless access point 115a and wireless access point 115b, and the counting of the boarding passengers can be performed automatically using their mobile devices 120. Since it is possible to determine the direction that a mobile device 120 has crossed boundary 405, the system would not be fooled by a passenger going in the opposite direction. If a passenger that has already checked in departs from the check-in area with their mobile device 120, the system can be configured to check out the user from the flight and/or alert the airport staff that a checked-in passenger has departed the check-in area.

These techniques could generally be used for counting passengers entering a check-in area as well as for checking in specific passengers. For example, the mobile device can be associated with its owner in various ways. For example, the MAC address of the mobile device can be associated with identification information for the owner, such as the owner's name, age, sex, address, citizenship, driver's license number, passport number, photograph, or other identifying information. In some implementations, the MAC address and owner identification can be associated when the mobile owner checks-in at an airline counter or kiosk where the identity of the owner can be verified by an airline employee and the mobile device 120 is physically close to the counter (as determined by RTT or other techniques).

Automatic Car Park or Highway Fee Payment

Automatic fee payments for car parks and toll roads could be implemented using the techniques disclosed herein. The mobile device 120 can in some instances be portable mobile device, such as a mobile phone, tablet computer, etc. that is associated with the user of the device or could be installed in a vehicle and associated with a particular vehicle. The mobile device may be a wireless access point that is associated with the vehicle.

When the mobile device 120 crosses the boundary 405 at an entry point to the car park or toll road, the cost of usage for the car park or toll road could be automatically charged to a user associated with the mobile device 120. The toll system can be configured to track when the mobile device 120 crosses a boundary 405 at an entry point and when the mobile device 120 crosses the boundary 405 at an exit point and determine a usage fee for the car park or toll road accordingly. For example, a car park might that charges based on the entry and exit times of the user could track when the user's vehicle entered and exited the car park and automatically debit the user's credit card or other account accordingly. In another example, a toll road that charges based on the distance that a user travels on the toll road could calculate the toll for a user based on where the user entered and exited the toll road and automatically debit the user's credit card or other account accordingly. The mobile device may be preregistered with a payment service or the user of the mobile device can be prompted to register with the payment service upon entry into a pay area or when proximate to a pay area.

Automatic Movie Theater Entrance Payment

Another example is where the fee is automatically charged when the mobile enters the movie theater entrance line in the correct direction. This can be similar to a pedestrian version of the automatic car park or highway fee payment example described above, where the user of a mobile device 120 is automatically charged when the mobile enters the movie theater entrance line in the correct direction.

Linear Positioning in Mines

If one wireless access point 115*a* is located at the entrance of the mine gallery, and another wireless access point 115*b* at the other end of the gallery, an accurate measurement can be made of the position of the mobile device 120 along the gallery, even if the gallery is not completely straight. A RSSI based solution would not work in such an environment, because there is no well-defined propagation model for wireless signals in a mine gallery.

Example Hardware

Figure 5:
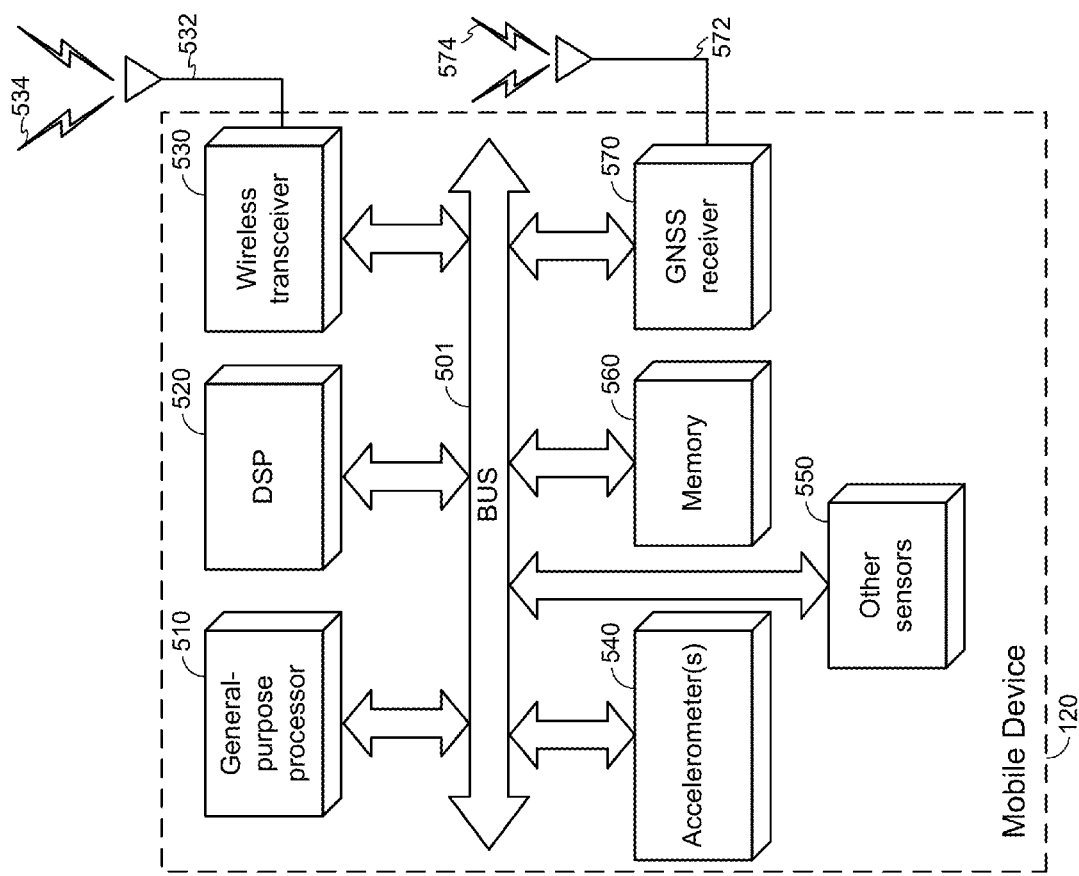
FIG. 5 is a block diagram of the mobile device illustrated in the preceding figures.

FIG. 5 is a block diagram of the mobile device 120 illustrated in the preceding figures. The mobile device 120 includes a computer system including a general-purpose processor 510, a digital signal processor (DSP) 520, a wireless transceiver 530, and a non-transitory memory 560, connected to each other by a bus 501. The mobile device 120 can also include one or more of the following features one or more accelerometers 540, other sensors 550, and a GNSS receiver 170. The wireless transceiver 130 is connected by a line 532 to an antenna 534 for sending and receiving communications to/from the wireless access points 115 shown in FIG. 1. The mobile device 120 can also include a GNSS receiver 570 to provide absolute positioning information that can be used in conjunction with the relative positioning techniques described above.

The GNSS receiver 570 is connected by a line 572 to an antenna 574 for receiving location signals (signals from which, at least in part, location of mobile device 120 can be determined) from satellites of one or more GNSS systems. The processor 510 can be an intelligent device, e.g., a personal computer central processing unit (CPU) such as those made by Intel® Corporation or AMD®, a microcontroller, an application specific integrated circuit (ASIC), etc. The memory 560 is a storage device that includes random access memory (RAM) and read-only memory (ROM). The memory 560 stores processor-readable, processor-executable software code containing instructions for controlling the processor 510 to perform functions described herein (although the description may read that the software performs the function(s)). The functions implement a relative positioning system. The software can be loaded onto the memory 560 by being downloaded via a network connection, uploaded from a disk, etc. Further, the software may not be directly executable, e.g., requiring compiling before execution. The functionality that has been described as implemented in software can also be implemented in hardware.

The mobile device 120 may include one or more other sensors 550 that are configured to measure various data that can be used to supplement the relative positioning information collected by the mobile device 120. For example, the other sensors 550 may include a magnetometer and/or a gyroscope and/or still other sensors. The accelerometer(s) 540 and/or one or more of the other sensors 550 is/are configured to provide information regarding the orientation of the mobile device 120.

The software in the memory 560 is configured to enable the processor 510 to make RTT measurements with the wireless transceiver 130 and can also be configured to enable the processor 510 to control access to electronic content and/or share electronic content based on the RTT measurements. The software is also configured to enable the processor 510 to determine the relative position of the mobile device 120 from other mobile devices 120 or wireless access points 115 based on the RTT measurements. In some implementations, the software can be configured to enable the processor 510 to provide a user interface that allows the user to control which content can be shared with the other mobile devices, to control which other mobile devices 120 can access which content, and to control which shared content can be received from which other mobile devices 120. The software can be configured to determine the relative distances between mobile devices 120 determined using RTT and to control access to shared content at least in part according to the distance between the mobile devices 120 according to the various techniques described above.

Figure 6:
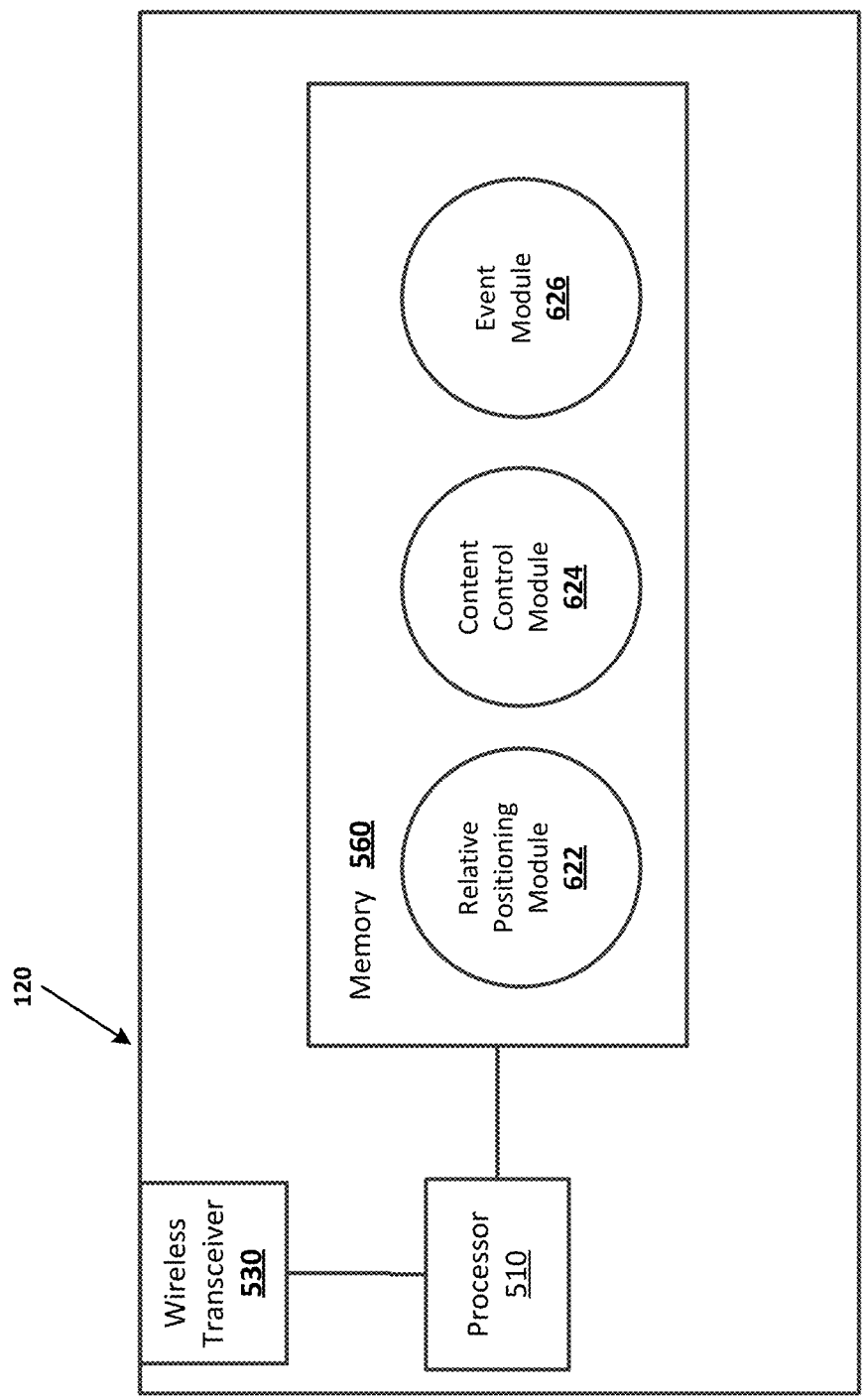
FIG. 6 is a block diagram of the mobile device illustrated in the preceding figures that illustrates examples of functional modules that can be implemented in the memory of the mobile device.

FIG. 6 is a block diagram of the mobile device 120 illustrated in the preceding figures that illustrates functional modules that can be comprise the mobile implemented in the memory 560 of the mobile device 120. For the sake of clarity, some of the elements of the mobile device 120 illustrated in FIG. 5 have been omitted from the block diagram of the mobile device 120 illustrated in FIG. 6.

The mobile device 120 includes a relative positioning module 622, a content control module 624, and an event module 626 in memory 560. The modules can comprise processor-executable instructions that can be executed by processor 510. The functional modules disclosed herein can alternatively be implemented in hardware or in a combination of hardware and software.

The mobile device 120 may also include other modules that are not illustrated herein that can provide other functionality. The relative positioning module 622 and the content control module 624 of the mobile device 120 can be used to implement the processes illustrated in FIGS. 8-10.

The relative positioning module 622 can be configured to determine the relative position of the mobile device 120 with respect to one or more wireless access points 115 and/or mobile devices 120. The relative positioning module 622 can be configured to determine whether the mobile device 120 has crossed a boundary defined by two or more wireless access points 115. The relative positioning module 622 can control the mobile device 120 to perform RTT measurements. The relative positioning module 622 can control the mobile device 120 to send a first signal the wireless access point 115, receive a second signal from the wireless access point 115 in response to the first signal, and determine a RTT for the signal based on the time that the first signal was transmitted by the wireless access point 115 and the time that the second signal was received by the mobile device 120.

The content control module 624 can be configured to control access to the electronic content by the mobile device 120 and/or share content with other mobile devices 120. The mobile device 120 can control access to electronic content associated with the mobile device 120. The electronic content can be stored on the mobile device 120, on network 110, on server 125, or wireless access point 115 and the electronic content may be stored in an encrypted form. The electronic content can comprise electronic copies of documents, books, text, music, video, and/or sound content, or other types of electronic content. The electronic content can also include executable software applications that can be executed on a mobile device. The content control module 624 can be configured to share access to the electronic content associated with the mobile device 120 with the other mobile devices 120 based on the proximity of the other mobile devices to the mobile device 120 as determined using the RTT measurements determined by the relative positioning module 622.

The electronic content may be stored on the mobile device 120 and/or a remote location, such as server 125 or elsewhere on the network 110. The content control module 624 can be configured to push the electronic content to another mobile device 120. The content control module 624 can also be configured cause the mobile device 120 to transmit a signal to another mobile device 120 that includes a directory of available content, and the mobile device 120 can be configured to display the directory of available content to the user and to provide an interface that allows a user of the mobile device 120 to download the electronic content to the mobile device 120. The electronic content may be stored at the wireless access point 115, on the server 125, on the network 110, or at another remote location accessible to the wireless access point 115 via the network 110, and the content control module 624 can be configured to access content not located on the wireless access point 115 and copy the content to the mobile device 120 and the other mobile device 120 can access the content from the mobile device 120, or the content control module 624 can be configured send the electronic content that the content control module 624 accessed from a remote location to the other mobile device 120. The electronic content can comprise electronic copies of documents, books, text, music, video, and/or sound content, or other types of electronic content.

Figure 7:
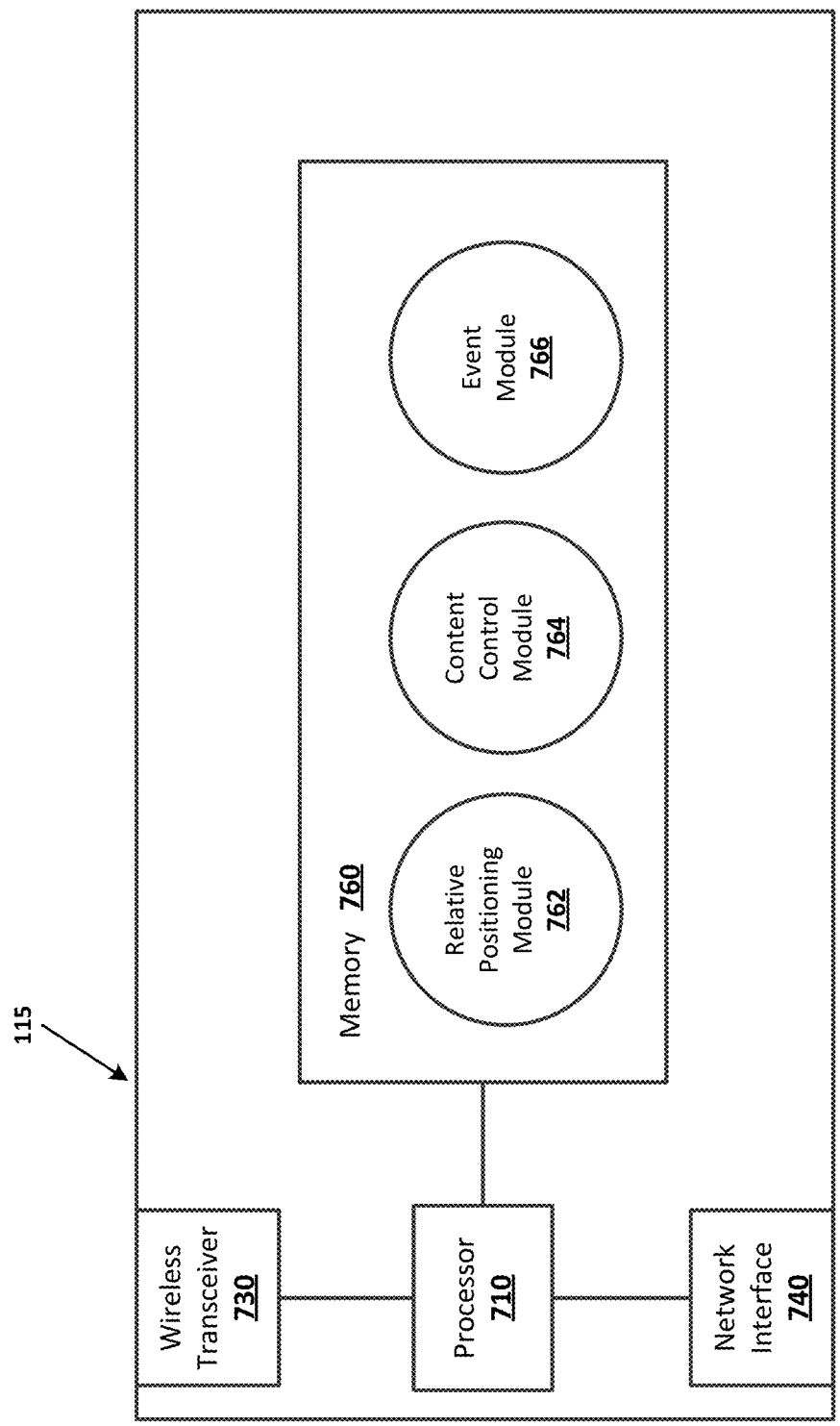
FIG. 7 is a block diagram of the wireless access point 115 illustrated in the preceding figures.

FIG. 7 is a block diagram of the wireless access point 115 illustrated in the preceding figures. The wireless access point 115 includes a general-purpose processor 710, a memory 760, a wireless transceiver 730, and a network interface 740.

The processor 710 can be an intelligent device, e.g., a personal computer central processing unit (CPU) such as those made by Intel® Corporation or AMD®, a microcontroller, an application specific integrated circuit (ASIC), etc. The memory 760 is a storage device that includes random access memory (RAM) and read-only memory (ROM). The memory 760 stores processor-readable, processor-executable software code containing instructions for controlling the processor 710 to perform functions described herein (although the description may read that the software performs the function(s)). The functions implement a relative positioning system. The software can be loaded onto the memory 760 by being downloaded via a network connection, uploaded from a disk, etc. Further, the software may not be directly executable, e.g., requiring compiling before execution.

The wireless access point 115 includes a relative positioning module 762, a content control module 764, and an event module 766 in memory 760. The modules can comprise processor-executable instructions that can be executed by processor 710. The functional modules described herein can alternatively be implemented in hardware or in a combination of hardware and software.

The wireless access point 115 may also include other modules that are not illustrated herein that can provide other functionality. The relative positioning module 762 and the content control module 764 of the wireless access point 115 can be used to implement the processes illustrated in FIGS. 8-10.

Relative positioning module 762 can control the wireless access point 115 to perform RTT measurements. The relative positioning module 762 can control the wireless access point 115 to send a first signal to the mobile device 120, receive a second signal from the mobile device 120 in response to the first signal, and determine a RTT for the signal based on the time that the first signal was transmitted by the mobile device 120 and the time that the second signal was received by the wireless access point 115. The relative positioning module 762 can be configured to determine the relative position of a mobile device 120 with respect to one or more wireless access points 115 and/or other mobile devices 120. The relative positioning module 762 can be configured to determine whether the mobile device 120 has crossed a boundary defined by two or more wireless access points 115.

Content control module 764 can be configured to push the electronic content to a mobile device 120. Content control module 764 can also be configured cause the wireless access point 115 to transmit a signal to the mobile device 120 that includes a directory of available content, and the mobile device 120 can be configured to display the directory of available content to the user and to provide an interface that allows a user of the mobile device 120 to download the electronic content to the mobile device 120. The electronic content may be stored at the wireless access point 115, on the server 125, on the network 110, or at another remote location accessible to the wireless access point 115 via the network 110, and the content control module 764 can be configured to access content not located on the wireless access point 115 and copy the electronic content to the wireless access point 115 from which the mobile device 120 can access the electronic content, or the content control module 764 can be configured send the electronic content that the content control module 764 accessed from a remote location to the mobile device 120. The electronic content can comprise electronic copies of documents, books, text, music, video, and/or sound content, or other types of electronic content. The electronic content can also include executable software applications that can be executed on a mobile device.

The event module 766 can be configured to trigger various types of events in response to the mobile device 120 being proximate to another mobile device 120 or to a particular wireless access point 115, and/or in response to the mobile device 120 crossing a boundary defined by two or more wireless access points 115. For example, the event module 766 can be configured to retrieve information about a particular space, such as a room in a museum or a particular store in a shopping mall, and to push the retrieved content to the mobile device 120 in response to the mobile device 120 crossing the boundary 405. The event module 766 can also be configured to process a payment for a usage fee responsive to user device being associated with a paid access area, such as a movie theater, an airport, a pay parking lot, a museum, a toll road, an entertainment venue, or other service provider that tracks access to or from a particular controlled access area. A user account associated with the mobile device 120 could be debited for the usage fee or an invoice requesting payment for the usage fee could be generated and sent to the user. For example, if the mobile device 120 crosses a boundary being monitored, the subscriber of the mobile device might be charged a usage fee for accessing the area being monitored. The service provider might also make information available to users of the mobile device 120 or push content to the mobile device 120 when the mobile device 120 crosses a boundary being monitored.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media. Tangible media include one or more physical articles of machine readable media, such as random access memory, magnetic storage, optical storage media, and so on.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Such media also provide examples of non-transitory media, which can be machine readable, and wherein computers are an example of a machine that can read from such non-transitory media.

The generic principles discussed herein may be applied to other implementations without departing from the spirit or scope of the disclosure or claims.

What is claimed is:

1. A method for determining whether a mobile device crosses a boundary defined by a first wireless access point and a second wireless access point, the method comprising:
    receiving, at the mobile device, information defining the boundary defined by the first wireless access point and the second wireless access point, the boundary being defined at least in part based on a ratio of a round trip time (RTT) between the mobile device and the first wireless access point to an RTT between the mobile device and the second wireless access point;
    determining, at the mobile device, the ratio of the RTT between the mobile device and the first wireless access point to the RTT between the mobile device and the second wireless access point;
    determining whether the mobile device has crossed the boundary; and
    triggering an event responsive to the mobile device crossing the boundary.

2. The method of claim 1, further comprising:
    determining the RTT between the mobile device and the first wireless access point by measuring a first amount of time from transmission of a first message from the mobile device to receipt of a first acknowledgement of the first message at the mobile device; and
    determining the RTT between the mobile device and the second wireless access point by measuring a second amount of time from transmission of a second message from the mobile device to receipt of a second acknowledgement of the second message at the mobile device.

3. The method of claim 1, further comprising:
    determining a set of possible positions of the mobile device relative to the first wireless access point and the second wireless access point.

4. The method of claim 1 wherein the boundary comprises a line separating the first wireless access point and the second wireless access point.

5. The method of claim 1 wherein the mobile device is mounted on a vehicle and the first wireless access point and the second wireless access point are mounted proximate and collinear to a roadway on which the vehicle is traveling such that the boundary bisects the roadway to facilitate monitoring of traffic flow along the roadway.

6. A method for determining whether a mobile device crosses a boundary defined by a first wireless access point and a second wireless access point, the method comprising:
    receiving, at the mobile device, information defining the boundary defined by the first wireless access point and the second wireless access point, the boundary being defined at least in part based on a ratio of a round trip time (RTT) between the mobile device and the first wireless access point to an RTT between the mobile device and the second wireless access point;

repeatedly determining the ratio of the RTT between the mobile device and the first wireless access point to the RTT between the mobile device and the second wireless access point by determining RTT values between the mobile device and the first wireless access point and RTT values between the mobile device and the second wireless access point;

determining a direction of travel of the mobile device based at least in part on the RTT values;

determining whether the mobile device has crossed the boundary in a first direction or in a second direction based on the direction of travel of the mobile device; and triggering an event responsive to the mobile device crossing the boundary in the first direction.

7. A method for determining whether a mobile device crosses a boundary defined by a first wireless access point and a second wireless access point, the method comprising:

receiving, at the mobile device, information defining the boundary defined by the first wireless access point and the second wireless access point, the boundary being defined at least in part based on a ratio of a round trip time (RTT) between the mobile device and the first wireless access point to an RTT between the mobile device and the second wireless access point, wherein the mobile device is associated with a vehicle and the boundary is associated with an entrance to a paid access area;

determining the ratio of the RTT between the mobile device and the first wireless access point to the RTT between the mobile device and the second wireless access point;

determining whether the mobile device has crossed the boundary; and triggering an event responsive to the mobile device crossing the boundary, wherein triggering the event responsive to the mobile device crossing the boundary comprises triggering storage of a time stamp responsive to the mobile device crossing the boundary in a first direction to enter the paid access area; and triggering calculation of usage fees based on an elapsed time in the paid access area responsive to the mobile device crossing the boundary in a second direction.

8. The method of claim 7 wherein the paid access area comprises a toll road.

9. The method of claim 7 wherein the paid access area comprises a pay parking lot.

10. The method of claim 9 further comprising:

calculating parking fees based on the elapsed time in the pay parking lot responsive to the triggering of the calculation of the usage fees.

11. An apparatus for determining whether a mobile device crosses a boundary defined by a first wireless access point and a second wireless access point, the apparatus comprising:

means for receiving, at the mobile device, information defining the boundary defined by the first wireless access point and the second wireless access point, the boundary being defined at least in part based on a ratio of a round trip time (RTT) between the mobile device and the first wireless access point to a RTT between the mobile device and the second wireless access point;

means for determining, at the mobile device, the ratio of the RTT between the mobile device and the first wireless access point to the RTT between the mobile device and the second wireless access point;

means for determining whether the mobile device has crossed the boundary; and means for triggering an event responsive to the mobile device crossing the boundary.

12. The apparatus of claim 11, further comprising:

means for determining the RTT between the mobile device and the first wireless access point by measuring a first amount of time from transmission of a first message from the mobile device to receipt of a first acknowledgement of the first message at the mobile device; and means for determining the RTT between the mobile device and the second wireless access point by measuring a second amount of time from transmission of a second message from the mobile device to receipt of a second acknowledgement of the second message at the mobile device.

13. The apparatus of claim 11, further comprising:

means for determining a set of possible positions of the mobile device relative to the first wireless access point and the second wireless access point.

14. The apparatus of claim 11 wherein the boundary comprises a line separating the first wireless access point and the second wireless access point.

15. The apparatus of claim 11 wherein the mobile device is mounted on a vehicle and the first wireless access point and the second wireless access point are mounted proximate and collinear to a roadway on which the vehicle is traveling such that the boundary bisects the roadway to facilitate monitoring of traffic flow along the roadway.

16. An apparatus for determining whether a mobile device crosses a boundary defined by a first wireless access point and a second wireless access point, the apparatus comprising:

means for receiving, at the mobile device, information defining the boundary defined by the first wireless access point and the second wireless access point, the boundary being defined at least in part based on a ratio of a round trip time (RTT) between the mobile device and the first wireless access point to a RTT between the mobile device and the second wireless access point;

means for repeatedly determining the ratio of the RTT between the mobile device and the first wireless access point to the RTT between the mobile device and the second wireless access point comprising means for repeatedly determining RTT values between the mobile device and the first wireless access point and RTT values between the mobile device and the second wireless access point;

means for determining a direction of travel of the mobile device based at least in part on the RTT values;

means for determining whether the mobile device has crossed the boundary in a first direction or in a second direction based on the direction of travel of the mobile device; and means for triggering an event responsive to the mobile device crossing the boundary in the first direction.

17. An apparatus for determining whether a mobile device crosses a boundary defined by a first wireless access point and a second wireless access point, the apparatus comprising:

means for receiving, at the mobile device, information defining the boundary defined by the first wireless access point and the second wireless access point, the boundary being defined at least in part based on a ratio of a round trip time (RTT) between the mobile device and the first wireless access point to a RTT between the mobile device and the second wireless access point wherein the mobile device is associated with a vehicle and the boundary is associated with an entrance to a paid access area;

means for determining the ratio of the RTT between the mobile device and the first wireless access point to the RTT between the mobile device and the second wireless access point;
means for determining whether the mobile device has crossed the boundary; and
means for triggering an event responsive to the mobile device crossing the boundary, the means for triggering comprising
means for triggering storage of a time stamp responsive to the mobile device crossing the boundary in a first direction to enter the paid access area; and
means for triggering calculation of usage fees based on an elapsed time in the paid access area responsive to the mobile device crossing the boundary in a second direction.

18. The apparatus of claim 17 wherein the paid access area comprises a toll road.

19. The apparatus of claim 17 wherein the paid access area comprises a pay parking lot.

20. The apparatus of claim 19 further comprising:
means for calculating parking fees based on an elapsed time in the pay parking lot responsive to the calculation of the usage fees being triggered.

21. A computer-readable storage medium, having stored thereon computer-readable instructions for determining whether a mobile device crosses a boundary defined by a first wireless access point and a second wireless access point, comprising instructions configured to cause at least one processor to:
receive, at the mobile device, information defining the boundary defined by the first wireless access point and the second wireless access point, the boundary being defined at least in part based on a ratio of a round trip time (RTT) between the mobile device and the first wireless access point to an RTT between the mobile device and the second wireless access point;
determine, at the mobile device, the ratio of the RTT between the mobile device and the first wireless access point to the RTT between the mobile device and the second wireless access point;
determine whether the mobile device has crossed the boundary; and
trigger an event responsive to the mobile device crossing the boundary.

22. The computer-readable storage medium of claim 21, further comprising instructions configured to cause the at least one processor to:
determine the RTT between the mobile device and the first wireless access point by measuring a first amount of time from transmission of a first message from the mobile device to receipt of a first acknowledgement of the first message at the mobile device; and
determine the RTT between the mobile device and the second wireless access point by measuring a second amount of time from transmission of a second message from the mobile device to receipt of a second acknowledgement of the second message at the mobile device.

23. The computer-readable storage medium of claim 21, further comprising instructions configured to cause the at least one processor to:
determine a set of possible positions of the mobile device relative to the first wireless access point and the second wireless access point.

24. The computer-readable storage medium of claim 21 wherein the boundary comprises a line separating the first wireless access point and the second wireless access point.

25. The computer-readable storage medium of claim 21 wherein the mobile device is mounted on a vehicle and the first wireless access point and the second wireless access point are mounted proximate and collinear to a roadway on which the vehicle is traveling such that the boundary bisects the roadway to facilitate monitoring of traffic flow along the roadway.

26. A computer-readable storage medium, having stored thereon computer-readable instructions for determining whether a mobile device crosses a boundary defined by a first wireless access point and a second wireless access point, comprising instructions configured to cause at least one processor to:
receive, at the mobile device, information defining the boundary defined by the first wireless access point and the second wireless access point, the boundary being defined at least in part based on a ratio of a round trip time (RTT) between the mobile device and the first wireless access point to an RTT between the mobile device and the second wireless access point;
repeatedly determine the ratio of the RTT between the mobile device and the first wireless access point to the RTT between the mobile device and the second wireless access point by repeatedly determining RTT values between the mobile device and the first wireless access point and RTT values between the mobile device and the second wireless access point;
determine a direction of travel of the mobile device based at least in part on the RTT values;
determine whether the mobile device has crossed the boundary in a first direction or in a second direction based on the direction of travel of the mobile device; and
trigger an event responsive to the mobile device crossing the boundary in the first direction.

27. A computer-readable storage medium, having stored thereon computer-readable instructions for determining whether a mobile device crosses a boundary defined by a first wireless access point and a second wireless access point, comprising instructions configured to cause at least one processor to:
receive, at the mobile device, information defining the boundary defined by the first wireless access point and the second wireless access point, the boundary being defined at least in part based on a ratio of a round trip time (RTT) between the mobile device and the first wireless access point to an RTT between the mobile device and the second wireless access point, wherein the mobile device is associated with a vehicle and the boundary is associated with an entrance to a paid access area;
determine the ratio of the RTT between the mobile device and the first wireless access point to the RTT between the mobile device and the second wireless access point;
determine whether the mobile device has crossed the boundary; and
trigger an event responsive to the mobile device crossing the boundary, wherein the instructions configured to cause the at least one processor to trigger the event response to the mobile device crossing the boundary comprise instructions configured to cause the at least one processor to
trigger storage of a time stamp responsive to the mobile device crossing the boundary in a first direction to enter the paid access area, and
trigger calculation of usage fees based on an elapsed time in the paid access area responsive to the mobile device crossing the boundary in a second direction.

28. The computer-readable storage medium of claim 27 wherein the paid access area comprises a toll road.

29. The computer-readable storage medium of claim 27 wherein the paid access area comprises a pay parking lot.

30. The computer-readable storage medium of claim 29 further comprising instructions configured to cause the at least one processor to:
calculate parking fees based on an elapsed time in the pay parking lot responsive to the calculation of the usage fees being triggered.

31. An apparatus for determining whether a mobile device crosses a boundary defined by a first wireless access point and a second wireless access point comprising:
a wireless transceiver configured to transmit signals to and to receive signals from the first wireless access point and the second wireless access point;
a non-transitory computer-readable memory;
a plurality of modules comprising processor executable code stored in the non-transitory computer-readable memory;
a processor connected to the non-transitory computer-readable memory and configured to access the plurality of modules stored in the non-transitory computer-readable memory; and
a relative positioning module configured to
receive, at the mobile device, information defining the boundary defined by the first wireless access point and the second wireless access point, the boundary being defined at least in part based on a ratio of a round trip time (RTT) between the mobile device and the first wireless access point to an RTT between the mobile device and the second wireless access point;
determine, at the mobile device, the ratio of the RTT between the mobile device and the first wireless access point to the RTT between the mobile device and the second wireless access point;
determine whether the mobile device has crossed the boundary; and
trigger an event responsive to the mobile device crossing the boundary.

32. The apparatus of claim 31 wherein the relative positioning module is further configured to:
determine the RTT between the mobile device and the first wireless access point by measuring a first amount of time from transmission of a first message from the mobile device to receipt of a first acknowledgement of the first message at the mobile device; and
determine the RTT between the mobile device and the second wireless access point by measuring a second amount of time from transmission of a second message from the mobile device to receipt of a second acknowledgement of the second message at the mobile device.

33. The apparatus of claim 31 wherein the relative positioning module is further configured to:
determine a position of the mobile device relative to the first wireless access point and the second wireless access point.

34. The apparatus of claim 31 wherein the boundary comprises a line separating the first wireless access point and the second wireless access point.

35. The apparatus of claim 31 wherein the mobile device is mounted on a vehicle and the first wireless access point and the second wireless access point are mounted proximate and collinear to a roadway on which the vehicle is traveling such that the boundary bisects the roadway to facilitate monitoring of traffic flow along the roadway.

36. An apparatus for determining whether a mobile device crosses a boundary defined by a first wireless access point and a second wireless access point comprising:
a wireless transceiver configured to transmit signals to and to receive signals from the first wireless access point and the second wireless access point;
a non-transitory computer-readable memory;
a plurality of modules comprising processor executable code stored in the non-transitory computer-readable memory;
a processor connected to the non-transitory computer-readable memory and configured to access the plurality of modules stored in the non-transitory computer-readable memory; and
a relative positioning module configured to
receive, at the mobile device, information defining the boundary defined by the first wireless access point and the second wireless access point, the boundary being defined at least in part based on a ratio of a round trip time (RTT) between the mobile device and the first wireless access point to an RTT between the mobile device and the second wireless access point;
repeatedly determine the ratio of the RTT between the mobile device and the first wireless access point to the RTT between the mobile device and the second wireless access point by repeatedly determining RTT values between the mobile device and the first wireless access point and RTT values between the mobile device and the second wireless access point; and
determine a direction of travel of the mobile device based at least in part on the RTT values;
determine whether the mobile device has crossed the boundary wherein the relative positioning module being configured to determine whether the mobile device crosses the boundary is further configured to determine whether the mobile device crosses the boundary in a first direction or in a second direction based on the direction of travel of the mobile device; and
trigger an event responsive to the mobile device crossing the boundary in the first direction.

37. An apparatus for determining whether a mobile device crosses a boundary defined by a first wireless access point and a second wireless access point comprising:
a wireless transceiver configured to transmit signals to and to receive signals from the first wireless access point and the second wireless access point;
a non-transitory computer-readable memory;
a plurality of modules comprising processor executable code stored in the non-transitory computer-readable memory;
a processor connected to the non-transitory computer-readable memory and configured to access the plurality of modules stored in the non-transitory computer-readable memory; and
a relative positioning module configured to
receive, at the mobile device, information defining the boundary defined by the first wireless access point and the second wireless access point, the boundary being defined at least in part based on a ratio of a round trip time (RTT) between the mobile device and the first wireless access point to an RTT between the mobile device and the second wireless access point, wherein the mobile device is associated with a vehicle and the boundary is associated with an entrance to a paid access area;

determine the ratio of the RTT between the mobile device and the first wireless access point to the RTT between the mobile device and the second wireless access point;

determine whether the mobile device has crossed the boundary; and trigger an event responsive to the mobile device crossing the boundary, the relative positioning module being further configured to trigger storage of a time stamp responsive to the mobile device crossing the boundary in a first direction to enter the paid access area, and trigger calculation of usage fees based on an elapsed time in the paid access area responsive to the mobile device crossing the boundary in a second direction.

38. The apparatus of claim 37 wherein the paid access area comprises a toll road.

39. The apparatus of claim 37 wherein the paid access area comprises a pay parking lot.

40. The apparatus of claim 39 wherein the relative positioning module is further configured to:

trigger calculation of parking fees based on an elapsed time in the pay parking lot responsive to the calculation of the usage fees being triggered.

* * * * *